United States Patent
Ha et al.

(10) Patent No.: US 11,412,379 B2
(45) Date of Patent: *Aug. 9, 2022

(54) METHOD AND APPARATUS FOR CONTROLLING MOVING OBJECT USING IDENTIFICATION DEVICE

(71) Applicants: Hyundai Motor Company, Seoul (KR); Kia Motors Corporation, Seoul (KR)

(72) Inventors: Jae Jun Ha, Whasung-si (KR); Young Jun Moon, Whasung-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 130 days.

This patent is subject to a terminal disclaimer.

(21) Appl. No.: 16/782,265

(22) Filed: Feb. 5, 2020

(65) Prior Publication Data

US 2020/0260275 A1 Aug. 13, 2020

(30) Foreign Application Priority Data

Feb. 7, 2019 (KR) .................. 10-2019-0014345
Mar. 21, 2019 (KR) .................. 10-2019-0032594

(51) Int. Cl.
*H04W 12/06* (2021.01)
*H04W 64/00* (2009.01)
*G06F 21/32* (2013.01)
*G06F 21/34* (2013.01)
*H04W 60/06* (2009.01)
*H04W 12/63* (2021.01)

(52) U.S. Cl.
CPC ............ *H04W 12/06* (2013.01); *G06F 21/32* (2013.01); *G06F 21/34* (2013.01); *H04W 12/63* (2021.01); *H04W 60/06* (2013.01); *H04W 64/006* (2013.01)

(58) Field of Classification Search
CPC ....... B60R 25/24; B60R 25/31; B60R 25/102; B60R 25/08; B60R 25/045; B60R 25/34; B60R 2025/1016; G06N 20/00
See application file for complete search history.

(56) References Cited

U.S. PATENT DOCUMENTS

| | | | |
|---|---|---|---|
| 2006/0226950 A1* | 10/2006 | Kanou | G06F 21/74 713/185 |
| 2014/0240086 A1* | 8/2014 | Van Wiemeersch | G05B 1/00 340/5.51 |
| 2017/0129454 A1* | 5/2017 | Huang | G08B 21/22 |
| 2018/0268406 A1* | 9/2018 | Rice | G06Q 20/401 |
| 2018/0268628 A1* | 9/2018 | Jain | B60R 25/25 |
| 2019/0126843 A1* | 5/2019 | Bouchard | B60R 16/03 |
| 2019/0232917 A1* | 8/2019 | Meng | B60R 25/33 |

* cited by examiner

*Primary Examiner* — Dai Phuong
(74) *Attorney, Agent, or Firm* — Morgan, Lewis & Bockius LLP

(57) ABSTRACT

A method of controlling a moving object using an identification device may include recognizing the identification device by the moving object; identifying and authenticating a user with the recognized identification device; and providing a service to the authenticated user.

19 Claims, 10 Drawing Sheets

METHOD AND APPARATUS FOR CONTROLLING MOVING OBJECT USING IDENTIFICATION DEVICE

CROSS REFERENCE TO RELATED APPLICATION

The present application claims priority to Korean Patent Application Nos. 10-2019-0014345, filed Feb. 7, 2019 and 10-2019-0032594, filed Mar. 21, 2019, the entire contents of which is incorporated herein for all purposes by this reference.

BACKGROUND OF THE INVENTION

Field of the Invention

The present invention relates to a method and apparatus for controlling a moving object using an identification device, or a method and apparatus for attaching or detaching an identity device to a moving object.

Description of Related Art

Subscriber Identity Modules (SIMs) are used in smart devices and smartphones. Furthermore, the Universal Subscriber Identity Module (USIM) technology may be called a mobile communication system (GSM), as a form further advanced than a SIM card. In the present case, the USIM may be a small size chip which is essentially inserted into a terminal of asynchronous 3G mobile communication (WCDMA) capable of video communication. Herein, the USIM is composed of a small CPU and memory, in which the CPU identifies the user by the encryption and decryption function, the memory may be used as a storage space for additional services and is used in various forms. Such a SIM card may be applied to a moving object, which will be described below.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus configured for controlling a moving object using an identification device.

Various aspects of the present invention are directed to providing a method and apparatus configured for controlling a moving object utilizing a plurality of identification devices.

Various aspects of the present invention are directed to providing a method and apparatus configured for attaching or detaching an identification device to or from a moving object.

Various aspects of the present invention are directed to providing a method and apparatus configured for preventing an identification device from detaching in an unauthorized manner.

The methods and apparatuses of the present invention have other features and advantages which will be apparent from or are set forth in more detail in the accompanying drawings, which are incorporated herein, and the following Detailed Description, which together serve to explain certain principles of the present invention.

According to an exemplary embodiment of the present invention, a method of controlling a moving object using an identification device, the method comprises recognizing the identification device by the moving object, identifying and authenticating a user through the recognized identification device and providing a service to the authenticated user.

Wherein when boarding of the user is recognized, the recognizing of the identification device is performed, and the recognizing of the identification device is performed regardless of whether the moving object is turned on.

According to an exemplary embodiment of the present invention, a method of detaching an identification device from a moving object, the method comprises mounting the identification device on the moving object to be recognized and detaching the identification device from the moving object, wherein when the moving object and the identification device satisfy a predetermined condition, the identification device is switched to a state capable of being detached from the moving object.

Wherein when the moving object is turned off, the predetermined condition is satisfied.

Wherein when the identification device is detached while the moving object is turned on, authentication is performed through another device based on the identification device, and when the authentication is completed, the predetermined condition is satisfied so that the identification device is switched to a state capable of being detached.

Wherein when the moving object is driving while being turned on, the identification device is not capable of being detached.

Wherein the moving object and the identification device perform an authentication procedure, and when the authentication procedure is completed, the predetermined condition is satisfied so that the identification device is switched to a state of capable of being detached.

Wherein when the moving object and the identification device perform the authentication procedure, the moving object is configured to transmit a message for the authentication procedure to other device and receives a response message for completing the authentication procedure from the other device so that the authentication procedure is finished.

Wherein the other device is a device registered in the moving object or a device authenticated to the moving object.

Wherein the authentication procedure is performed, based on at least one of iris recognition, fingerprint recognition, face recognition, voice recognition, vehicle head unit input, and FOB key.

Wherein user identification information for the authentication procedure is stored in the moving object, and the authentication procedure is performed based on the stored user identification information.

Wherein when the moving object determines that the identification device is detached before the authentication procedure is completed, the moving object is configured to determine whether the identification device is detached in an unauthorized manner.

Wherein the moving object is configured to determine whether the identification device is detached in an unauthorized manner through information exchange with an external device.

Wherein when the moving object determines that the identification device is detached in an unauthorized manner, the moving object is configured to transmit unauthorized detachment related information to an external device.

Wherein the external device includes at least one of a server in which the moving object is registered and a mobile device in which the moving object is registered.

Wherein when the moving object determines that the identification device is detached in an unauthorized manner while driving, the driving state information related to the moving object is obtained, and the driving of the moving object terminates based on the driving state information.

Wherein when the identification device is detached from the moving object, the moving object is switched to a standby mode.

Wherein the moving object is switched to a state in which only an operation for an emergency situation is performed in the standby mode.

According to an exemplary embodiment of the present invention, a moving object to which an identification device is applied, the moving object comprises a transceiver configured of transmitting and receiving a signal and a processor configured of controlling the transceiver, wherein the processor is configured to recognize the identification device when the identification device is mounted, and determines that the identification device is detached from the moving object, and the identification device is switched to a state capable of being detached from the moving object when the moving object and the identification device satisfy a predetermined condition.

Wherein when the moving object is turned off, the predetermined condition is satisfied.

According to an exemplary embodiment of the present invention, the moving object may be controlled by utilizing the identification device.

According to an exemplary embodiment of the present invention, the moving object may be controlled by utilizing the multi-identification device.

According to an exemplary embodiment of the present invention, the identification device may be attached to and detached from the moving object.

According to an exemplary embodiment of the present invention, a method of preventing an identification device in an unauthorized manner may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Technical problems to be achieved in an exemplary embodiment of the present invention are not limited to the above-mentioned technical problems, and other technical problems not mentioned above will be clearly understood by those skilled in the art from the following description.

Figure 1:
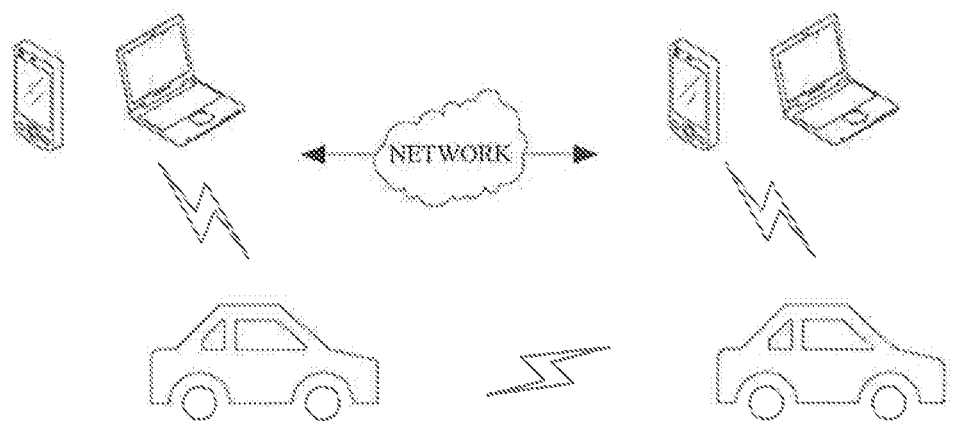
FIG. 1 is a diagram illustrating a method in which a moving object communicates with other devices.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail so that those skilled in the art can easily carry out the present invention referring to the accompanying drawings. However, the present invention may be embodied in various forms and is not limited to the exemplary embodiments described herein.

In the following description of the exemplary embodiments of the present invention, a detailed description of known functions and configurations incorporated herein will be omitted when it may make the subject matter of the present invention rather unclear. Parts not related to the description of the present invention in the drawings are omitted, and similar parts are denoted by similar reference numerals.

In an exemplary embodiment of the present invention, when a component is "connected", "coupled", or "fixed" to another component, it means that the component is not only directly connected to the another component, but also the component is indirectly connected to the another component with other components in between. Furthermore, when a component "includes" or "has" another component, it means that the component may further include another component without excluding other components, unless stated otherwise.

In an exemplary embodiment of the present invention, terms such as first and second are used only for the purpose of distinguishing one component from other components, and do not limit the order or importance between the components unless mentioned. Accordingly, within the scope of the present invention, a first component in an exemplary embodiment of the present invention may be referred to as a second component in another exemplary embodiment of the present invention, and likewise, a second component in an exemplary embodiment of the present invention may be referred to as a first component in another exemplary embodiment of the present invention.

In an exemplary embodiment of the present invention, the components distinguished from each other are for clearly describing each feature, and do not necessarily mean that the components are separated. That is, a plurality of components may be integrated into one hardware or software unit, or one component may be distributed and formed into a plurality of hardware or software units. Therefore, even if not mentioned otherwise, such integrated or distributed embodiments are included in the scope of the present invention.

In an exemplary embodiment of the present invention, components described in various embodiments do not necessarily mean essential components, and some thereof may be optional components. Therefore, an exemplary embodiment composed of a subset of components described in an exemplary embodiment of the present invention is also included in the scope of the present invention. Furthermore, embodiments including other components in addition to the components described in the various embodiments are included in the scope of the present invention.

Advantages and features of the present invention, and methods for achieving them will be apparent with reference to the exemplary embodiments described below in detail with reference to the accompanying drawings. However, the present invention is not limited to the exemplary embodiments set forth below, but may be implemented in various forms, and only the exemplary embodiments are provided to make the spirit of the present invention complete, and to fully inform those of ordinary skill in the art of the scope of the present invention.

FIG. 1 is a diagram illustrating a method in which a moving object communicates with other moving objects or devices through a network. Referring to FIG. 1, a moving object may communicate with other moving objects or other devices. Herein, as an example, the moving object may communicate with other moving objects or other devices, based on cellular communication, WAVE communication, dedicated short range communication (DSRC), or another communication scheme. That is, as the cellular communication network, a communication network such as LTE, 5G, WiFi communication network, WAVE communication network, etc. may be used. Also, a local area network used in a moving object such as DSRC may be used, but the present invention is not limited thereto.

Furthermore, for example, with respect to the communication of a moving object, a module capable of communication with only a device located inside the moving object and a module capable of communication with a device outside the moving object may be separated from each other for the security of the moving object. For example, inside a moving object, communication may be performed on the basis of security only for a device within a certain range of the moving object, such as Wi-Fi communication. For example, a moving object and a moving object driver's personal device may include a communication module for performing only communication with each other. That is, the moving object and the moving object driver's personal device may use a communication network which is blocked from an external communication network. Also, as an example, the moving object may include a communication module for performing communication with an external device. Also, as an example, the above-described module may be implemented as one module. That is, the moving object may communicate with another device on the basis of one module, but the present invention is not limited thereto. That is, the communication method in the moving object may be implemented on the basis of various methods, but the present invention is not limited thereto.

Herein, as an example, the moving object may refer to a device capable of moving. For example, the moving object may be a vehicle (including an autonomous vehicle, an automated vehicle), a drone, mobility, a pallet, a mobile office, a mobile hotel, or a personal air vehicle (PAV). Furthermore, the moving object may be another moving device, but the present invention is not limited thereto.

FIG. 2 is a diagram illustrating a method of applying an identification device to a moving object.

For example, the identification device may be a device having at least one of a user, a control target, and a service target identification function. Also, as an example, the identification device may be a device having an ID function. Also, for example, the identification device may be at least one of a smart device, a smart module, a user identification module, and an identification module. In other words, the identification device may be a hardware configuration. Also, as an example, the identification device may be used for the above-described identification in a software configuration. Herein, as an example, the identification device may be a subscriber identity module (SIM). For example, the SIM applied to the moving object as the identification device may be at least one of a mobility SIM (M-SIM) or a vehicle SIM (V-SIM). Furthermore, as an example, the identification device may be a module which is the same as or compatible with the conventional SIM, but the present invention is not limited thereto. The following will be described on the basis of the identification device, which may be replaced by a smart module, a user module, a SIM, and the like, but the present invention is not limited thereto. In the following description, the identification device is described for convenience of description. As described above, the identification device may be applied to the moving object in consideration of the case in which the moving object communicates with the external device. For example, the smart phone may recognize a smart phone user through a USIM as a universal subscriber identification module and provide a service. For example, when the same brand or identification device and the device are mutually compatible, only the identification device of the user may be changed to distinguish the user of the corresponding device, and service may be provided on the basis of the same. The moving object may also embed an identification device card on the basis of the foregoing. For example, in the identification device applied to the moving object, a vehicle SIM may be referred to as a VSIM.

That is, a new type of identification device may be applied as an identification device applied to a moving object. For example, VSIM may be compatible with USIM or other SIM. Furthermore, the VSIM may further provide other services in consideration of moving object characteristics, but the present invention is not limited thereto. Furthermore, an identification device card applied to a moving object may be provided and may be referred to as another name, but the present invention is not limited thereto.

Meanwhile, as an example, referring to FIG. 2, there may be a portion to which an identification device may be applied inside a moving object. Herein, FIG. 2 is only one example in which the identification device is applied, but the present invention is not limited thereto. There may be a portion to which the identification device is applied in a visually identifiable zone of the moving object's driver seat as shown in FIG. 2A. As an exemplary embodiment of the present invention, an identification device may be applied inside the storage box of the moving object's passenger seat as shown in FIG. 2B. As an exemplary embodiment of the present invention, an identification device may be inserted into a portion where a display of a moving object exists, but the present invention is not limited thereto.

Figure 2A:
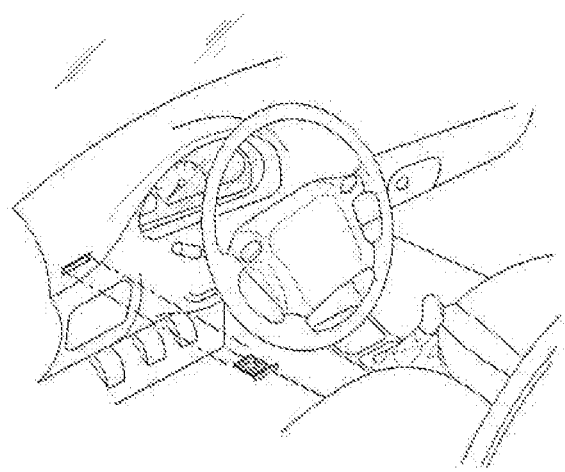
FIG. 2A, FIG. 2B, FIG. 2C and FIG. 2D are diagrams illustrating a method of applying an identification device to a moving object.
Figure 2B:
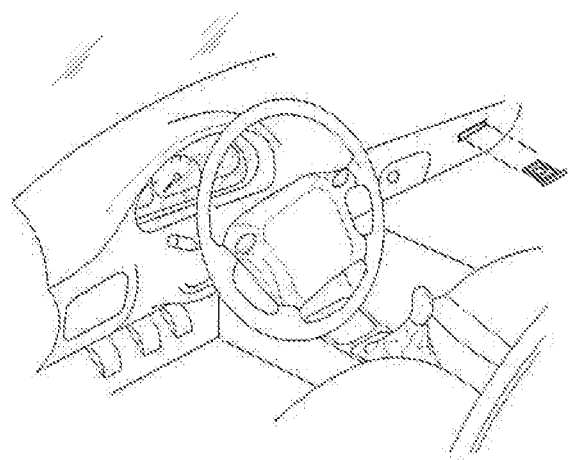
Figure 2C:
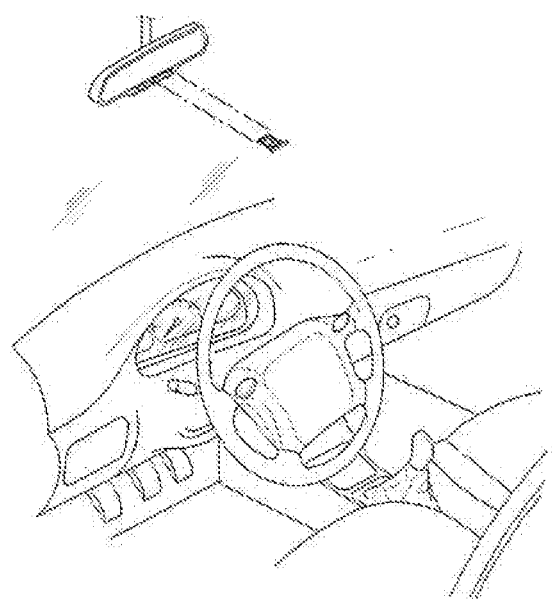
Figure 2D:
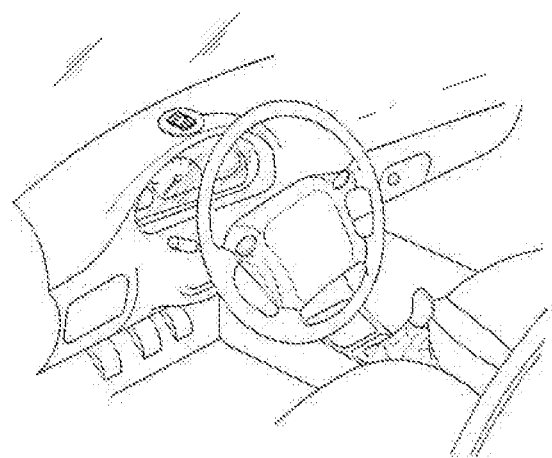

As an exemplary embodiment of the present invention, the identification device may be mounted on a mirror inside the moving object as shown in FIG. 2C. For example, the mirror inside the moving object may be easily accessed by the occupant without affecting the driving of the moving object or other devices of the moving object, and thus the identification device may be mounted on the mirror inside the moving object. As an exemplary embodiment of the present invention, the identification device may be mounted in a cradle or pad as shown in FIG. 2D. For example, when the moving object is controlled by the identification device, a plurality of cases may occur in which the identification device is replaced for each user. In view of the foregoing, the identification device may be mounted on a cradle or a pad to increase mounting convenience of the identification device, and may be used for controlling a moving object. Meanwhile, as an example, the cradle or pad may allow the identification device to be mounted on the basis of magnetic properties. Furthermore, as an example, the identification device may be mounted in the cradle or the pad on the basis of another method, but the present invention is not limited thereto.

As an exemplary embodiment of the present invention, the identification device may be implemented in combination with a tool key or a vehicle key in consideration of the portability of the identification device. That is, the identification device may be mounted on the tool key or the car key, and the identification device may be detached from the car key and then mounted on the moving object. For example, the USIM or similar type of identification device may be small in size. Furthermore, the identification device has a portion which is in contact with the moving object, in which the portion in contact is needed to prevent damage. In view of the foregoing, the identification device may be coupled to a vehicle key or a tool key. As an exemplary embodiment of the present invention, the car key or the tool key itself may be an identification device. That is, each user may own his/her own car key or tool key as an identification device, and the moving object may be controlled on the basis of the identification device. Meanwhile, as an example, when the car key or the tool key is an identification device, the car key or the tool key may be mounted on the moving object as shown in FIG. 2. Furthermore, as an example, the car key or the tool key may communicate with the moving object through short-range communication (e.g., Bluetooth, Beacon, and NFC), through which message exchange and identification may be performed. That is, the car key or the tool key that reflects the uniqueness of the individual may be used as the identification device, but the present invention is not limited thereto.

As an exemplary embodiment of the present invention, the above-described identification device may be mounted through an existing device mounted on a moving object. For example, the moving object may be provided with an existing device (e.g., hi-pass terminal, black box). Herein, when a separate mounting part is configured on the moving object to mount the identification device, the equipment for the moving object must be changed. The configuration or parts for additional mounting may be required and the existing device may be used to mount the identification device. That is, the identification device may be configured to be mounted on the existing mounted device. As an exemplary embodiment of the present invention, the identification device may be recognized through an existing terminal (e.g. USB port, cigar jack) included in the moving object.

As an exemplary embodiment of the present invention, the identification device may be applied at any position within a range that makes it possible to be authenticated by the moving object, and the identification device may be integrally or separately applied to a control unit, a communication unit, or parts of the moving object.

The moving object may include a separate mounting unit of mounting the identification device or a component on which the identification device is mounted. That is, the identification device may be mounted on a moving object as one independent portion, separately from other parts. As an exemplary embodiment of the present invention, the identification device may be mounted on a moving object to be included in at least one of a control unit, a communication unit, and another unit as described above. For example, the control unit or the communication unit in the moving object may be a unit of performing communication with an external device or controlling information. Herein, the identification device may provide necessary information to the above-described control unit and communication unit or perform operations through identification and authentication. That is, the identification device may be a device closely related to the control unit or the communication unit, and thus may be mounted on the moving object in combination with the units. That is, the identification device may be mounted on the moving object integrally with other units. As an exemplary embodiment of the present invention, the identification device may be implemented as an embedded identification device in a moving object. The embedded identification device may be physically implemented inside a moving object or may be implemented in software during a moving object operation and design process, but the present invention is not limited thereto. This will be described later.

For example, to mount an identification device, in case of changing a facility of a moving object or installing an additional configuration, the cost may be high. In consideration of the foregoing, the identification device may be mounted (or recognized) through an existing terminal included in the moving object. Through this, the identification device may be easily applied to the existing moving object, but the present invention is not limited thereto.

Herein, when the identification device is applied to the moving object, the moving object may perform subscriber identification on the basis of the identification device. That is, similar to a smartphone, the moving object may also identify the moving object user on the basis of the identification device. Herein, the identification device may include environment information according to the user, such as driving record information, navigation setting information, moving object setting information, driver seat information, steering information, etc. Here, when the moving object recognizes the identification device, the moving object may change the moving object setting on the basis of the information included in the identification device. Also, as an example, the identification device may charge for using the moving object. For example, the moving object may also perform communication as described above, and perform billing on the basis of the communication. Also, as an example, billing, may be performed on the basis of the use of a shared moving object or another moving object. Herein, the usage object, the moving distance, etc. may be verified through the identification device using the moving object, and billing may be performed on the basis of the same. That is, by applying the identification device to the moving object, a system may be constructed on the basis of information on the use of the moving object. Also, as an example, when the identification device is not applied to the moving object, the moving object may not be operated. For example, the moving object may be operated only when the identification device is applied to be recognized. However, for example, some driving may be possible in consideration of an emergency situation.

Furthermore, for example, the identification device may communicate with neighboring IoT devices and receive a service on the basis of the identification device. For example, IoT devices may also be provided with an identification device. For example, the identification devices may be applied only to smart phones at present, but a plurality of identification devices that are mutually compatible and identify the same user may be applied to a plurality of devices such as smartphones, moving objects, and home appliances. That is, the service may be provided to a plurality of devices through an identification device configured for the same user.

Also, as an example, when a moving object includes an identification device, the moving object may operate in combination with the ITS infrastructure. For example, when performing autonomous driving of a moving object, an identification device may be recognized in the moving object, and the autonomous driving service may be provided through a nearby ITS infrastructure through the recognized identification device. Herein, authentication of the user may be performed through the identification device, and the service may be provided on the basis of the authenticated user information.

Furthermore, as an example, service/security may be provided through the identification device. Furthermore, a shared service may be provided by an identification device, like a moving object sharing service.

Figure 3:
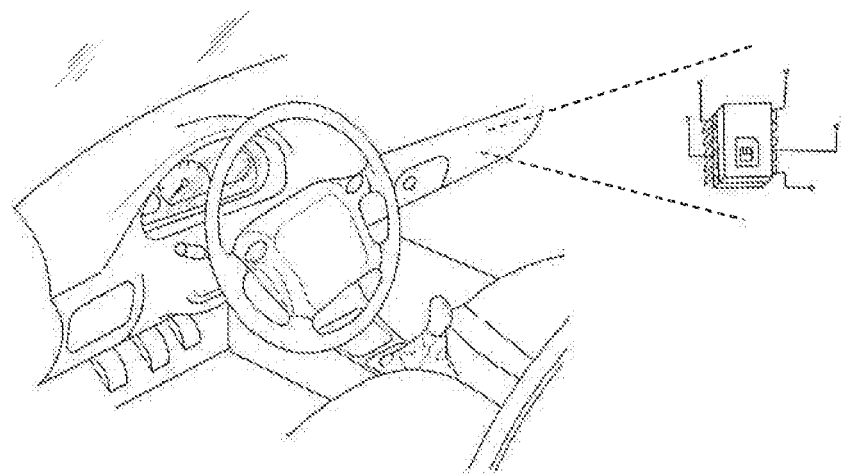
FIG. 3 is a diagram illustrating a method of applying a multi-identification device to a moving object.

Also, as an example, referring to FIG. 3, an identification device may be applied to a moving object as an embedded identification device (or embedded SIM, embedded SIM, ESIM). Herein, an ESIM may refer to a digital SIM mounted inside a moving object rather than a physical card like a USIM. For example, a SIM that encrypts authentication information included in the SIM and loads the same in the moving object may be referred to as an ESIM. Herein, as an example, the information included in the ESIM of the moving object may be modified on the basis of remote or other communication. That is, in the case of a moving object, an owner may exist, and authentication information based on the owner may be required. Herein, since the owner of the moving object may be information which is not easily changed, the user identification information may be implemented through the ESIM, and the moving object operation may be performed through authentication. Herein, as an example, when the ESIM is applied to the moving object, authentication may be performed on the basis of an authentication system in the moving object (or mobility). As an exemplary embodiment of the present invention, authentication for the ESIM embedded in the moving object may be performed on the basis of the mobile device. For example, the mobile device may be a smart device, a head unit, or the like. That is, authentication for the ESIM embedded in the moving object may be performed on the basis of a separate mobile device.

As an exemplary embodiment of the present invention, an ESIM embedded in a moving object may be authenticated on the basis of communication with a server. For example, the smart device may recognize the SIM through communication with the base station. The ESIM of the moving object may perform authentication on the basis of the communication between the ESIM and the server according to a similar manner, and operate on the basis of the authentication.

As an exemplary embodiment of the present invention, an ESIM embedded in a moving object may be authenticated on the basis of a D2D scheme or an M2M scheme. For example, when an owner or driver of a moving object tries to drive the moving object, a mobile device may be provided. Furthermore, as an example, a mobile device in a moving object may be used. Herein, authentication for the ESIM embedded in the moving object may be performed with the mobile device positioned to be adjacent on the basis of the D2D scheme. For example, the authentication method as described above may be performed in consideration of moving object security. As an exemplary embodiment of the present invention, as described above, an identification device configured for the same user may exist in multiple devices and moving objects. For example, the mobile device to which the identification device of the same user is applied and the ESIM of the moving object may perform authentication to each other. Furthermore, for example, authentication of the ESIM of the moving object may be performed on the basis of another server or a D2D scheme via the identification device of the mobile device.

As an exemplary embodiment of the present invention, with reference to FIG. 2 and FIG. 3 described above, the ESIM may not be physically present and thus may not be detached or removed in the case of FIG. 3. However, in the case of a general identification device, the moving object may be detached in consideration of a moving object theft or other situation. Herein, as an example, a system for preventing the moving object from being robbed and forcibly removed may be necessary. For example, in the case that the identification device is applied to the moving object, additional authentication via another mobile device may be required when the identification device is to be detached. That is, the identification device may be detached after authentication and confirmation is performed on the basis of another device mutually authenticated with the identification device of the moving object. As an exemplary embodiment of the present invention, the detachment of the identification device may be performed through personal authentication. For example, authentication may be performed on the basis of unique characteristics of the user, such as fingerprint recognition, iris recognition, or facial recognition, and the detachment may be performed only by the authenticated user. Furthermore, for example, the detachment of the identification device may be performed only when necessary information is authenticated on the basis of artificial intelligence. For example, only the authenticated user may perform the detachment on the basis of the recognition information related to an image, a voice, or the like of the user.

Furthermore, for example, it is possible to perform control on the ITS infrastructure or the traffic system through the identification device of the moving object. For example, it is possible to perform communication with the server or the RSU through the identification device of the moving object, and it possible to perform the control on the basis of the same.

As an exemplary embodiment of the present invention, the moving object may directly control the traffic infrastructure on the basis of edge computing. For example, it is possible to perform user authentication and control IoT or ITS infrastructures through an identification device of a moving object. For example, the street lamp may be operated in an area adjacent to a moving object while driving on the basis of the authenticated user. In other words, it is possible to prevent delays and increase operational efficiency by performing direct control through authentication of the identification device of the moving object with the surrounding infrastructure, not central control.

Furthermore, as an example, as described above, the identification device may include information related to a user. Herein, when authentication is performed on the moving object through the identification device, control of the moving object may be changed on the basis of user information included in the identification device, which was described above. For example, when the moving object completes authentication through an identification device, moving object setting information such as a sheet, a display, a moving object control, a navigation service, and the like may be automatically set on the basis of the identification device. That is, the identification device may perform not only authentication, but also a control device function for increasing the convenience of using the moving object.

Furthermore, as an example, as described above, the identification device may be applied to the moving object sharing system. For example, a shared moving object may be used by a plurality of users periodically. In consideration of the foregoing, performing control of the shared moving object for each user may be inefficient for operation. Accordingly, the moving object user may be identified through the identification device, and the control for the moving object may be performed on the basis of the identification. That is, the tenant for the shared moving object mounts his/her identification device on the moving object, and utilizes the shared moving object when the identification device is recognized by the moving object. Meanwhile, for example, in the shared service, as described above, a personal setting such as a sheet, a display, a steering of a moving object, etc. may be changed on the basis of user information included in the identification device, which was described above. Furthermore, in the case of a shared service, billing for using a moving object may be performed through the identification device. In other words, since the standard for distinguishing the use of moving objects for each user is not clear, each individual may be charged through the identification device. As an exemplary embodiment of the present invention, a case where another user shares the individual moving object may be considered. Herein, as an example, the tenant may control the moving object through the lessor's identification device. Herein, the lessor may provide the tenant with the control authority for the identification device, and the tenant may control the moving object through the lessor's identification device on the basis of the granted control authority. For example, the control authority may be a password or authentication of the tenant device. As an exemplary embodiment of the present invention, both the lessor identification device and the tenant identification device may exist, and a plurality of identification devices may be recognized in the moving object, which will be described later.

As an exemplary embodiment of the present invention, when the identification device is applied to a moving object, the authentication may be performed on the basis of a server in consideration of moving object security. For example, the server may include a security certificate and information necessary for security. Only when the security is authenticated through the identification device of the moving object and the security of the server, the authentication of the moving object is completed and the moving object may be used.

As an exemplary embodiment of the present invention, when the identification device is applied to a moving object, security may be performed without a server in consideration of security of the moving object. For example, the moving object may communicate with surrounding moving objects or other devices on the basis of V2X or V2V communication. Herein, each moving object or device may include hash values on the basis of the block chain, and mutual security may be authenticated through a network structure on the basis of the foregoing. In other words, the moving object may be secured through the block chain.

Figure 4:
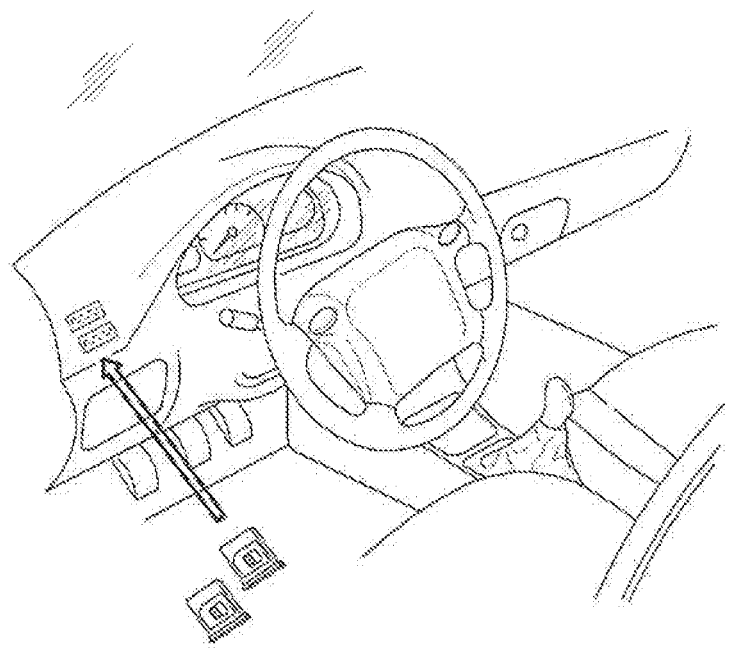
FIG. 4 is a diagram illustrating a method of applying a multi-identification device to a moving object.
Figure 5:
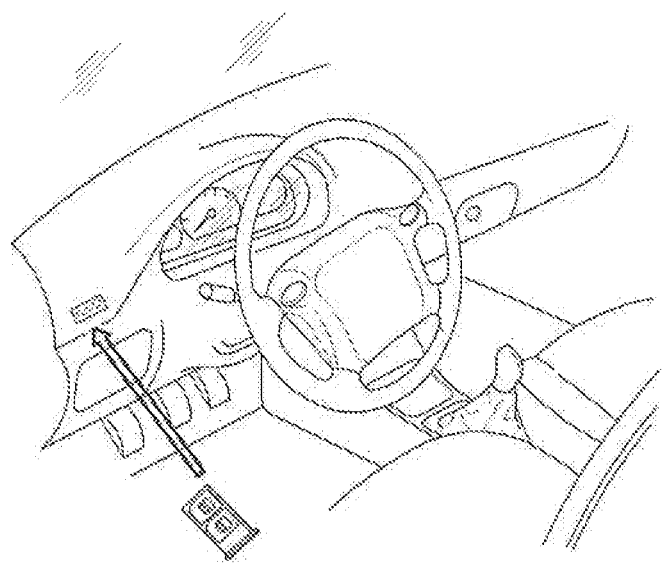
FIG. 5 is a diagram illustrating a method of applying an embedded identification device to a moving object.

Referring to FIG. 4, a multi-identification device may be applied to a moving object. Herein, as an example, as shown in FIG. 4, an insert structure for each of multiple identification devices may exist in the moving object. As an exemplary embodiment of the present invention, referring to FIG. 5, the multi-identification device may be a structure in which multiple identification devices may be simultaneously inserted into one insert structure. Furthermore, as an example, the multi-identification device may also be designed as an insert structure which is not visually visible, such as a passenger compartment storage box as described above, but the present invention is not limited thereto. As an exemplary embodiment of the present invention, the multi-identification device may also be implemented by an ESIM. For example, the moving object may be used by individual owners, but there may be a plurality of drivers such as a family. In consideration of the foregoing, when the ESIM is implemented in the moving object, the ESIM may be embedded in consideration of a plurality of users. For example, the authentication method may be different for an authenticated user capable of driving, except for a moving object owner and a moving object owner among a plurality of users implemented by the ESIM. That is, a plurality of identification devices may be implemented in consideration of a plurality of drivers. Herein, as an example, user authentication may be performed on a plurality of identification devices. Furthermore, as described above, the setting may be changed for each user in association with the moving object control system. Herein, as an example, even when ESIM for multiple users is applied to the moving object, authentication may be performed on the basis of the authentication system. As an exemplary embodiment of the present invention, authentication for the ESIM embedded in the moving object may be performed on the basis of the mobile device. For example, the mobile device may be a smart device, a head unit, or the like. That is, authentication of the ESIM embedded in the moving object may be performed on the basis of a separate mobile device configured for each of a plurality of users of a plurality of identification devices.

As an exemplary embodiment of the present invention, an ESIM embedded in a moving object may be authenticated on the basis of communication with a server. For example, the smart device may recognize the identification device through communication with the base station. The ESIM of the moving object may be authenticated on the basis of the communication between the ESIM and the server according to the similar method, and perform operation on the basis of the same.

As an exemplary embodiment of the present invention, an ESIM embedded in a moving object may be authenticated on the basis of a D2D scheme or an M2M scheme. For example, when the owner or driver of a moving object tries to drive the moving object, a mobile device may be provided. Furthermore, as an example, a mobile device in a moving object may be used. Herein, authentication for the ESIM embedded in the moving object may be performed with the mobile device positioned to be adjacent on the basis of the D2D scheme. For example, the authentication method as described above may be performed in consideration of moving object security. As an exemplary embodiment of the present invention, as described above, an identification device configured for the same user may exist in multiple devices and moving objects. For example, the mobile device to which the identification device of the same user is applied and the ESIM of the moving object may perform mutual authentication to each other. Furthermore, for example, authentication of the ESIM of the moving object may be performed on the basis of another server or a D2D scheme via the identification device of the mobile device.

As an exemplary embodiment of the present invention, the ESIM may not be physically present and thus may not be detached or removed. However, in the case of a general identification device, the moving object may be detached in consideration of a moving object theft or other situation. Herein, as an example, a system for preventing the moving object from being robbed and forcibly removed may be necessary. For example, in the case that the identification device is applied to the moving object, additional authentication via another mobile device may be required when the identification device is to be detached. That is, the identification device may be detached after authentication and confirmation based on another device mutually authenticated with the identification device of the moving object. As an exemplary embodiment of the present invention, the detachment of the identification device may be performed through personal authentication. For example, authentication may be performed on the basis of unique characteristics of the user, such as fingerprint recognition, iris recognition, or facial recognition, and detachment may be performed only by the authenticated user. Furthermore, for example, the detachment of the identification device may be performed only when necessary information is authenticated on the basis of artificial intelligence. For example, only the authenticated user may perform the detachment on the basis of the recognition information related to an image, a voice, or the like of the user. Herein, for example, multiple identification devices may be present, and each of the multiple identification devices may determine whether to perform detachment of each identification device on the basis of the authentication information.

Furthermore, for example, it is possible to perform control on the ITS infrastructure or the traffic system through the identification device of the moving object. For example, the communication with the server or the RSU may be performed through the identification device of the moving object, and the control may be performed on the basis of the communication.

As an exemplary embodiment of the present invention, a moving object may directly control the traffic infrastructure on the basis of edge computing. For example, user authentication may be performed through an identification device of a moving object, and IoT or ITS infrastructures may be controlled. For example, the street lamps may be operated in areas adjacent to a moving object while driving on the basis of the authenticated user. In other words, direct control is performed through authentication of the identification device of the moving object and the surrounding infrastructure, not central control, thereby preventing delays and increasing operational efficiency.

Furthermore, as an example, as described above, a plurality of identification devices may be applied in a moving object sharing system. For example, the shared moving object may be used by a plurality of users periodically. In consideration of the foregoing, a plurality of identification devices may be applied in consideration of control of a shared moving object. For example, a case in which a moving object is shared by another person as a moving object sharing service may be considered. Herein, there may be a moving object lessor's device and a moving object tenant's identification device. The lessor's device may be attached to the moving object when renting the moving object. Furthermore, the tenant may apply his/her identification device to the rental moving object. That is, the lessor's identification device and the tenant's identification device may be applied to the moving object. Herein, the tenant may perform authentication on the basis of the identification information included in his/her identification device as described above. Furthermore, the lessor may verify the identification device information related to the tenant to perform authentication, and may perform moving object rental on the basis of the same. Herein, as an example, billing for using the moving object and control for the moving object may be performed on the basis of the lessor's identification device and the tenant's identification device. For example, based on the foregoing, setting information (e.g., sheet, display) for a moving object stored in the tenant's identification device may be applied to the rental moving object. Herein, as an example, there may be setting information for which the setting change is not allowed by the lessor's identification device, in which the setting change of the tenant may be restricted. As an exemplary embodiment of the present invention, the lessor's identification device may perform billing for the tenant. For example, the tenant's identification device may be used to obtain moving object usage information and perform billing. However, in consideration of authentication and security, the lessor may perform billing for the moving object using his/her own identification device. That is, the lessor may acquire and store information related to moving object usage and moving object setting through the identification device, and perform billing for the shared moving object on the basis of the information.

As an exemplary embodiment of the present invention, there may be a master-slave relationship when there are multiple identification devices. For example, a main identification device and a slave identification device may exist among the multiple identification devices. Herein, considering the service of the main identification device and the service of the slave identification device, it is possible to determine the priority of the service and whether or not to apply the service. For example, in the moving object sharing system as described above, the lessor's identification device may have full control of the moving object control as the main identification device. Meanwhile, the tenant's identification device may only have control authority over information granted by the lessor as a slave identification device. That is, the lessor's identification device and the tenant's identification device may have a master-slave relationship. As an exemplary embodiment of the present invention, when the identification device is applied to a moving object, authentication may be performed on the basis of a server in consideration of moving object security. For example, the server may include a security certificate and information necessary for security. Only when the security is authenticated through the security of the moving object's identification device and the server, the authentication of the moving object is completed so that the moving object may be used. Herein, the above-described security may be performed for each of the multiple identification devices, but the present invention is not limited thereto.

As an exemplary embodiment of the present invention, when the identification device is applied to a moving object, security may be performed without a server in consideration of moving object security. For example, the moving object may communicate with surrounding moving objects or other devices on the basis of V2X or V2V communication. Herein, each moving object or device may include hash values on the basis of the block chain, and mutual security may be authenticated through a network structure on the basis of the foregoing. In other words, the moving object may be secured through the block chain.

Figure 6:
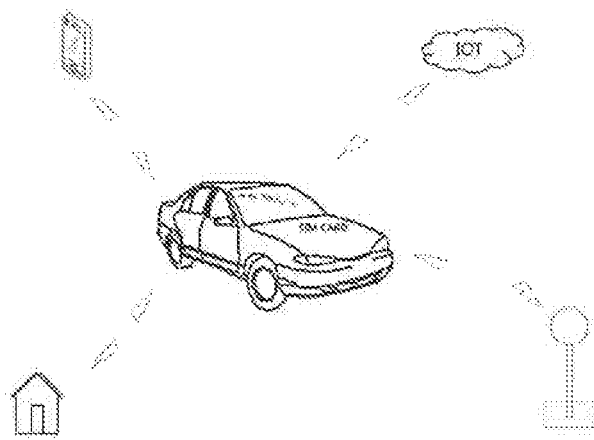
FIG. 6 is a diagram illustrating a method in which a moving object provides a service through an identification device.

FIG. 6 is a diagram illustrating a method of providing a service through a moving object to which an identification device is applied. Referring to FIG. 6, an identification device may be applied to a moving object as described above. Herein, various services may be provided through the identification device of the moving object. For example, the moving object driving record may be stored through the identification device of the moving object. Furthermore, moving object operation records may be verified for each individual and used through a server or a system.

The existing moving object operation information and related information may be stored and shared on the basis of the moving object. Herein, when the identification device is applied to the moving object, the user may be identified through the identification device, and the moving object operation information and the related information may be stored and used for each user. For example, the moving object driving information may include at least one of visited area information, driving distance information, driving pattern information, and driving route information. Furthermore, the moving object operation information may be information which may be used on the basis of the identification device user with respect to the moving object, but the present invention is not limited thereto. Herein, since the user may store and use moving object operation information related to the user on the basis of the identification device, the user may use the related information even when the moving object is changed. For example, the user may be provided with a service through autonomous driving or the ITS infrastructure on the basis of the information stored in the identification device. For example, the user may be provided with the service in relation to his/her own driving pattern, such as autonomous driving level, surrounding restaurant information, and information on a moving route. Herein, as described above, the corresponding information may be managed through the identification device. Furthermore, as an example, communication with other devices may be performed through the identification device of the moving object. For example, the other device may be a smart device such as a smart phone, a smart watch, or the like, and also may be peripheral devices based on IoT. As an exemplary embodiment of the present invention, there may be other devices based on the ITS infrastructure. Herein, the user may be identified and authenticated through the identification device of the moving object, thereby increasing the security of using the moving object. In the present case, other devices in the vicinity may be controlled through communication with the IoT devices. Furthermore, the user may control the vehicle provided with the identification device through his mobile device. As an exemplary embodiment of the present invention, the ITS infrastructure may also communicate with a user who is identified and authenticated through an identification device and provide a service for an autonomous driving or driving route, and the like, but the present invention is not limited thereto.

Meanwhile, for example, as described above, when the identification device is not identified and authenticated to the moving object, the control authority for the moving object may not be approved. For example, when the moving object is a vehicle, the vehicle may be directly controlled by turning on the start of the vehicle. However, in the case that the identification device is applied, when the vehicle is turned on and the identification and authentication of the identification device is completed, the vehicle may be controlled. The moving object may operate on the basis of full autonomous driving. Furthermore, as an example, the moving object may communicate with other devices through a communication network and operate on the basis of information received through the communication network. However, in the case of a moving object, a number of operations and functions may be defined for the purpose of movement. When identification and authentication are not guaranteed, there may be a risk of security problems and accidents. In consideration of the foregoing, the moving object may be turned on differently from the related art, and may be controlled when identification and authentication are performed on the basis of the identification device.

As an exemplary embodiment of the present invention, the identification device may operate regardless of whether the moving object is turned on. For example, the moving object may include a device configured for supplying power to another existing device, such as a black box. Herein, since the operation of the identification device does not consume much power, the identification device may operate regardless of whether the moving object is turned on. Herein, as an example, even when the moving object is not turned on, the identification device may perform the identification and authentication as described above. Meanwhile, for example, in the case that the moving object is not turned on, the identification device may be identified and authenticated when the vehicle owner's personal device is recognized to be triggered. As an exemplary embodiment of the present invention, even when the moving object is not turned on, when at least one of the sensor door switches recognizes that the driver or another user is in the moving object, the identification and authentication operation for the identification device may be performed, but the present invention is not limited thereto. That is, the identification device may operate even when the moving object is not turned on, but the present invention is not limited thereto.

Herein, as an example, the moving object may be prevented from being arbitrarily removed from the moving object in consideration of the foregoing. As described above, the risk for security and accidents may be large in the case of a moving object. Furthermore, as described above, in the case of operation based on the identification device, an accident risk may occur on the basis of an authentication error when the identification device is arbitrarily detached. In view of the foregoing, the identification device may be prevented from being arbitrarily detached. For example, the identification device may be arbitrarily attached and detached before the moving object is turned on. That is, when the moving object does not operate, the detachment of the identification device may not be locked. Therefore, the user who wants to use the moving object may replace the identification device and use the identification device suitable for the user before the moving object is turned on.

Herein, as an example, when the moving object is turned on, the identification device may be prohibited from being arbitrarily detached. That is, the detachment of the identification device may be locked. Through the foregoing, it is possible to prevent an accident caused by detachment of the identification device while the moving object is driven. Herein, as an example, even when the moving object is turned on, the detachment may be differently locked depending on whether the moving object is driven or not. For example, even when the moving object is turned on, when the moving object is not driving, the identification device may be detached after authentication of the separate device. For example, the separate device may be a smart device. Herein, the user may perform authentication for detachment of the identification device through the smart device, and may obtain the authority for detachment of the identification device by providing information related to the identification device to the moving object. Thereafter, when the detachment of the identification device is unlocked, and the identification device is detached from the moving object, the moving object may be turned off. Thereafter, when other identification device is mounted, the moving object may operate on the basis of the other identification device. Meanwhile, when the moving object is turned on and the moving object is driving, the identification device may not be detached even when authentication of other devices is performed. For example, when the moving object is driving, the driving may be performed by exchanging information with an external device through autonomous driving or communication. When an accident may occur when the identification device is randomly detached, it is desirable to prevent any detachment of the identification device.

Figure 7:
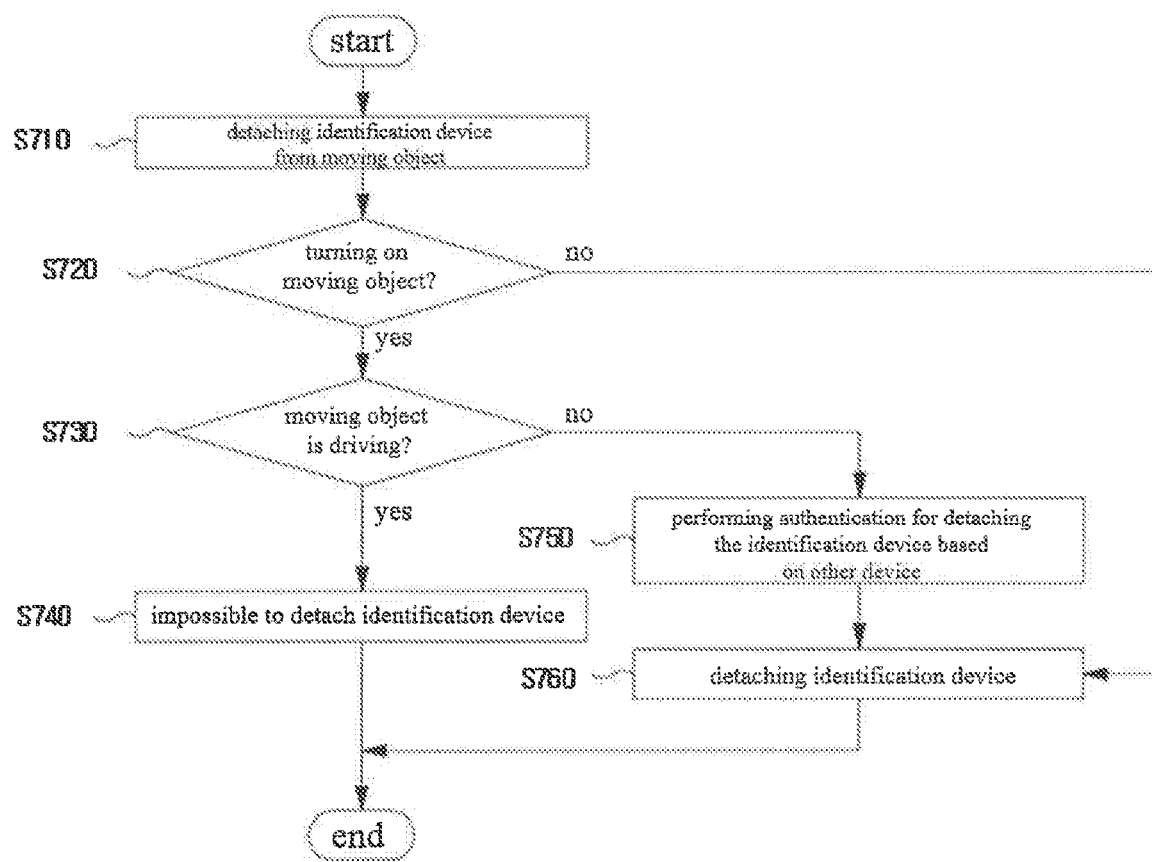
FIG. 7 is a diagram illustrating a method of detaching an identification device from a moving object.

As a specific example, referring to FIG. 7, an identification device may be detached from a moving object (S710). Herein, for example, the detachment of the identification device may be performed by a user or performed on the basis of a triggering operation received by a moving object. Herein, the triggering operation is performed by pressing a button or by receiving a signal for detachment from an external device, but the present invention is not limited thereto.

Herein, when the identification device is detached from the moving object, it is determined whether the moving object is turned on (S720). When the moving object is turned on, it is determined whether the moving object is being driven (S730). Herein, when the moving object is turned on and is driving, as described above, in consideration of security and accident risk, the identification device may not be detached from the moving object (S740). Meanwhile, when the moving object is not driving, a separate authentication for detaching the identification device may be performed on the basis of other device (S750). For example, as described above, the other device may be a smart device. That is, when the moving object is not driving, and a separate authentication is possible through another device, the identification device may be detached from the moving object (S760). Herein, as an example, when the identification device is detached from the moving object, the moving object may be switched to a turn off state. Meanwhile, when the moving object is turned off, the identification device may be detached, which was described above (S760).

As an exemplary embodiment of the present invention, referring to FIG. 8, a case in which the identification device is detached from the moving object may be considered. Herein, as an example, recognition and mounting of the identification device may be performed regardless of whether the moving object is turned on. However, when the identification device is detached from the moving object (S801), an authentication procedure for detaching the identification device may be performed (S802). Herein, the authentication procedure may be performed through another device (e.g., smart phone). For example, when the identification device is detached from the moving object, the moving object may detect the input of the user. That is, the user can press a button for detaching the identification device from the moving object. Herein, to prevent the identification device from being detached indiscriminately, the moving object may transmit a signal for detaching the identification device to other device. Herein, the other device may be a device registered in advance with a moving object and completed with authentication, or a device authenticated through the moving object. That is, by exchanging the signal with another authenticated device, and completing authentication on the basis of the same, the identification device may be detached (S803).

As an exemplary embodiment of the present invention, the authentication procedure may be performed on the basis of an input device included in a moving object. Herein, as an example, the moving object may perform authentication through at least one of iris recognition, fingerprint recognition, face recognition vehicle head unit input, FOB key, Internet pre-booking, another device, server, and mobile device. That is, the authentication for allowing the moving object to detach the identification device may be performed through devices in the moving object as well as other devices. Furthermore, as an example, the above-described authentication procedure may perform authentication on the basis of a unique feature of a registered user or an authenticated user. That is, authentication and recognition may be performed using the above-described iris recognition, fingerprint recognition, encryption key, or the like, but the present invention is not limited thereto.

Figure 8A:
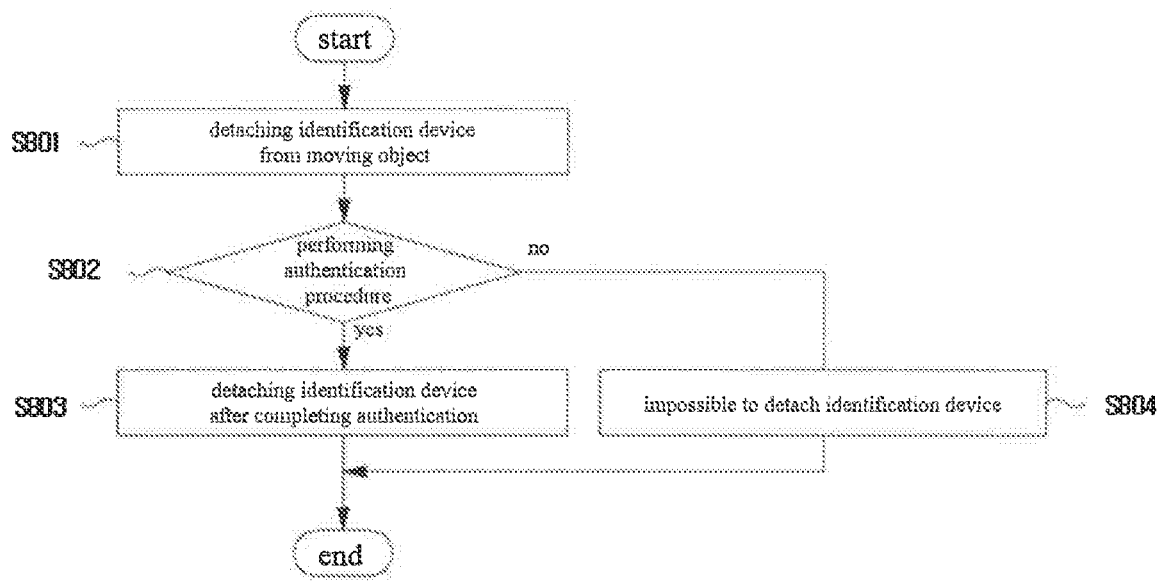
FIG. 8A, FIG. 8B and FIG. 8C are diagrams illustrating a method of detaching an identification device from a moving object.
Figure 8B:
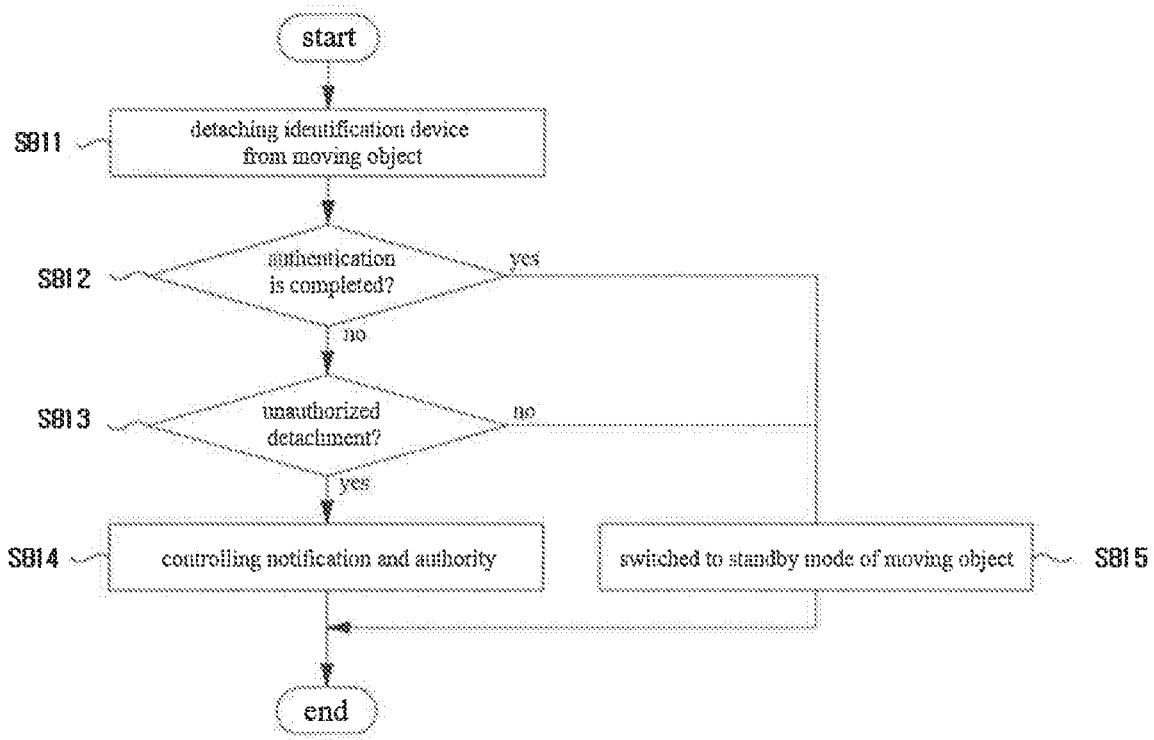

Herein, when the moving object completes the authentication to detach the identification device, the physical lock device may be released on the basis of the received signal. That is, the moving object may be switched to a state in which the user may detach the identification device when the authentication is completed. Meanwhile, when the authentication process is not completed, the identification device may not be detached (S804). Herein, as an example, the case where the identification device is detached without permission of the moving object may be considered, which will be described later with reference to FIG. 8B. Referring to FIG. 8B, a case where an identification device is detached from a moving object may be considered (S811). Herein, when authentication for detaching the identification device is completed as shown in FIG. 8A (S812), the identification device may be detached from the moving object (S814). For example, when the identification device is detached from the moving object, the moving object may be switched to a standby mode (S814). Herein, the standby mode may mean a state in which the moving object is turned on but is not controlled by the user. Furthermore, as an example, the user may control the moving object only when an emergency situation or an emergency action is required in the standby mode. As an exemplary embodiment of the present invention, in the standby mode, only some control may be allowed in such a manner to park the moving object or not to interfere with the operation of another vehicle. That is, in the standby mode, the user may perform only control in consideration of an emergency situation, and generally is not able to control the moving object, but the present invention is not limited thereto.

Herein, as an example, when the identification device is removed from the state in which the authentication device is not completed in the moving object (S812), the moving object may detect unauthorized detachment (S813). Herein, as an example, the moving object may detect unauthorized detachment through another device. That is, when the identification device is detached without authentication, the moving object may transmit information related to identification device detachment to another device. Herein, the other device may be an authenticated device or a device registered in a moving object. As an example, when an authentication error may occur between the moving object and the identification device, the detachment may be attempted without authentication of the identification device. Herein, as an example, in the above-described case, when the unauthorized detachment is detected, an unnecessary operation may be performed. Therefore, even in the case that the moving object is detached without authentication, when the moving object detects that unauthorized detachment is not performed, the notification or the authority may not be controlled. That is, when the moving object receives information indicating that unauthorized detachment has not been performed from another registered device, the moving object may recognize that the unauthorized detachment has not been performed and may switch to the above-described standby mode.

Meanwhile, when the moving object detects that the identification device is detached without authentication, and the unauthorized detachment is performed without authentication through another device (S813), the authority for the moving object is controlled and the notification may be provided (S814). For example, the moving object may inform other registered device of unauthorized detachment information. Furthermore, the moving object may provide a warning notification through an internal output unit. Furthermore, as an example, the authority for the moving object may be controlled. As an example, when the identification device is detached without permission, the moving object door may be locked. As other example, power, fuel, or energy supply to a driving source of a moving object may be blocked. Furthermore, as an exemplary embodiment of the present invention, the control authority for the moving object may be released to prevent the control of the moving object so that the movement or the driving of the moving object is prohibited or restricted, but the present invention is not limited thereto. Furthermore, as an example, the control authority for the communication network of the moving object may be released to prohibit communication with the external network through the moving object. That is, when the identification device is detached, the control authority for the communication network may also be released to prevent access to the moving object through the external network.

Figure 8C:
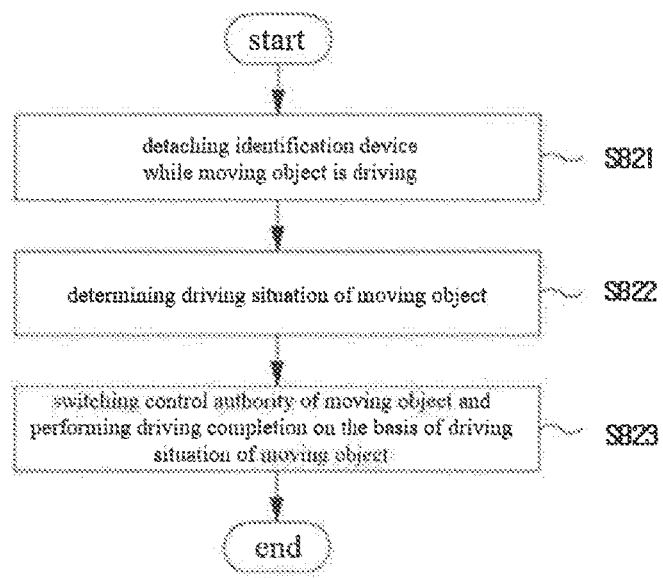

As an exemplary embodiment of the present invention, FIG. 8C illustrates a case in which the identification device is detached while the moving object is driving. Referring to FIG. 8C, the identification device may be detached while the moving object is driving. Herein, as an example, as described above, when the moving object is driving, the identification device may not be detached. However, as an example, a case in which the identification device is detached from the moving object may be considered, such as a recognition error of the identification device and a driving accident or an unauthorized detachment of the moving object (S821). Herein, for example, in the case that the moving object is in a driving state, the risk of an accident may increase when the moving object is turned off or the control authority is terminated. Therefore, when the identification device is detached while the moving object is driving, the moving object may determine the driving situation of the moving object (S822). For example, the moving object may determine the driving situation of the moving object using at least one of a driving speed, a driving position, and a surrounding image. Herein, the moving object may switch the control authority of the moving object and perform the driving completion on the basis of the driving situation (S823). The moving object performs an action for the detachment of the identification device on the basis of the driving situation. For example, when the identification device is detached due to an authentication error, the moving object may reduce the driving speed in consideration of the driving situation, and is moved to an area where the moving object may stop the driving. Herein, the driving speed may be slowly decelerated in consideration of the surrounding situation to prevent an accident of the moving object. Furthermore, as an example, when the identification device is detached, the moving object may receive real time information from an external device and receive necessary information upwards to a driving completion situation. Meanwhile, for example, the case where the identification device is detached due to an accident such as a collision of a moving object may be considered. Herein, for example, when the identification device is detached due to a collision of the moving object, the moving object is switched to the end of driving and may require additional measures to deal with the accident. Herein, the moving object may detect the driving situation and the state of the moving object and transmit the detected information to the external device. That is, the moving object detects an accident through detachment of an identification device, and the information related to the accident is transmitted to a server or an external device to provide the information on the accident situation.

As an exemplary embodiment of the present invention, when the identification device is detached from the moving object in an unauthorized manner, the moving object is configured to determine the driving situation and moves to the area where the driving may be terminated, to end the driving, and controls the authority of the moving object door, thereby preventing unauthorized detachment.

However, even when the identification device is detached in an unauthorized manner, emergency rescue functions such as transmitting emergency rescue signal from a moving object may be available. For example, a communication network used by a moving object may be provided with a communication capability in consideration of an emergency structure or an emergency situation. Herein, when the identification device is detached from the moving object, the control authority of the external network for the moving object may be released. That is, the moving object may not communicate with an external device. However, even in the above-described case, the functions for emergency rescue or emergency situation may be maintained in consideration of occurrence of an accident or an emergency situation in the moving object, but the present invention is not limited thereto.

As an exemplary embodiment of the present invention, in the case of an existing smart device (e.g., smart phone), it is common that a device user and an identification device (e.g., USIM) correspond one-to-one. For example, the user may not need to change the identification device except for reasons such as traveling abroad or smartphone damage. However, as an example, a moving object may be used by many users. For example, in the case of a vehicle, a case may be considered in which the vehicle may be driven by not only the vehicle owner but also a family member or acquaintance. In view of the foregoing, a plurality of users may be registered or authenticated on one identification device. For example, a plurality of users (e.g., vehicle owner and vehicle owner family) may be registered in one identification device. Herein, for example, a service or corresponding information used for each user may be different. In consideration of the foregoing, a plurality of users may be registered in the identification device. However, in the above-described case, even when the moving object is turned on and the identification device is identified and authenticated, additional authentication for user verification may be performed. For example, authentication of the additional user may be performed on the basis of the moving object and the device owned by the user. For example, the device owned by the user may receive a signal for authentication when the moving object is turned on and identification and authentication of the identification device are completed. For example, the above-described signal may be transmitted between the moving object and the user device on the basis of the short range communication module. Through this, the above-described signal may be transmitted only to the user inside the vehicle. Herein, a user may perform additional authentication in a corresponding device, and a specific user may be recognized among a plurality of users registered in an identification device to control the moving object.

Meanwhile, as an exemplary embodiment of the present invention, when using the moving object, as described above, additional authentication of the device owned by the user may be performed by another method. For example, when the moving object is turned on and the identification and authentication of the identification device is completed, the moving object may acquire additional authentication information. For example, the moving object may include a camera, recognize a user located in a vehicle driver's seat, and identify a specific user among users registered in the identification device on the basis of the same. As an exemplary embodiment of the present invention, fingerprint recognition or a separate authentication key may exist. That is, when the moving object is turned on and the identification and authentication of the identification device is completed, each user may be assigned a fingerprint or a separate authentication key (e.g., password), thereby identifying the user through the same. Also, as an example, the separate authentication may be at least one of fingerprint recognition, iris recognition, face recognition vehicle head unit input, FOB key, Internet pre-booking, another device, server, and mobile device. That is, separate authentication may be required, and the separate authentication method is not limited to the above-described embodiment. Herein, for example, separate authentication may perform authentication on the basis of unique characteristics for the user. As an exemplary embodiment of the present invention, authentication may be performed on the basis of recognition information on an image, a voice, and the like of a user, but the present invention is not limited thereto. As a specific example, the smart device may be always be carried by the user, but the moving object may be used on the basis of a periodic or event. Herein, for example, there may be a limit in completing identification and authentication only with the identification device in consideration of the above-described charging or setting information on the use of the moving object. Therefore, as described above, after the identification device completes identification and authentication, the moving object may be operated or controlled after completing the further authentication on the basis of the above-described method of detecting the user. As an exemplary embodiment of the present invention, when the identification device is used by a single user, additional authentication as described above may not be required. That is, in the case of a single user, additional authentication may not be required, and the moving object may be controlled immediately after identification and authentication of the identification device is completed.

As an exemplary embodiment of the present invention, as described above, the moving object may be controlled by the user only after identification and authentication are completed through the identification device. Furthermore, as an example, the moving object may be controlled only when additional authentication for the user is performed, but the present invention is not limited thereto. However, as an example, as described above, in the case of operation based on identification and authentication by the identification device, it may be difficult to cope with an emergency situation, in consideration of the foregoing, when the moving object detects or recognizes an emergency situation, the user may control the moving object regardless of the identification device. However, as an example, in the emergency situation, the setting based on the identification device may not be applied. That is, the control authority of the moving object may be allowed in consideration of a specific situation, but in other cases except the emergency situation, the moving object may be controlled by the identification device. Through the foregoing, when there are multiple users for the moving object, it is possible to operate the identification device. For example, a SIM card for a vehicle may be applied to the vehicle on the basis of the foregoing. Herein, multiple users may be registered in the SIM card, and the SIM card may operate through individual user confirmation after identification and authentication based on the identification device, but the present invention is not limited thereto.

Meanwhile, as an exemplary embodiment of the present invention, an additional procedure may be required when initial authentication is performed between the identification device and the moving object.

As described above, after the moving object is turned on, the identification device may be recognized so that the moving object is controlled on the basis of the identification device. However, when the identification device is first mounted on the moving object, an additional procedure may be performed on the basis of whether the identification device has authority to control the moving object and whether initial setting is possible. For example, when the identification device is first mounted while the moving object is turned on, the moving object may determine whether the identification device is an identification device first mounted. Herein, when the identification device is an identification device conventionally mounted, the moving object may perform setting for recognizing the identification device on the basis of the history information on the identification device and perform an authentication procedure on the basis of the same. That is, the moving object may quickly perform authentication on the identification device on the basis of the history information on the identification device.

Meanwhile, when the identification device is first mounted on the moving object, the moving object may determine whether the corresponding identification device has the authority to control the moving object. Herein, for example, the moving object may check information on a unique ID included in the identification device, and may determine whether the identification device has authority through the information. As an exemplary embodiment of the present invention, the moving object may interwork with the corresponding identification device and provide additional authentication information through a device (e.g., smartphone) for which authentication is completed. Herein, the moving object may confirm that the corresponding identification device is a device having authority from the device configured for which authentication is completed, and may perform initial authentication on the basis of the same.

Figure 9A:
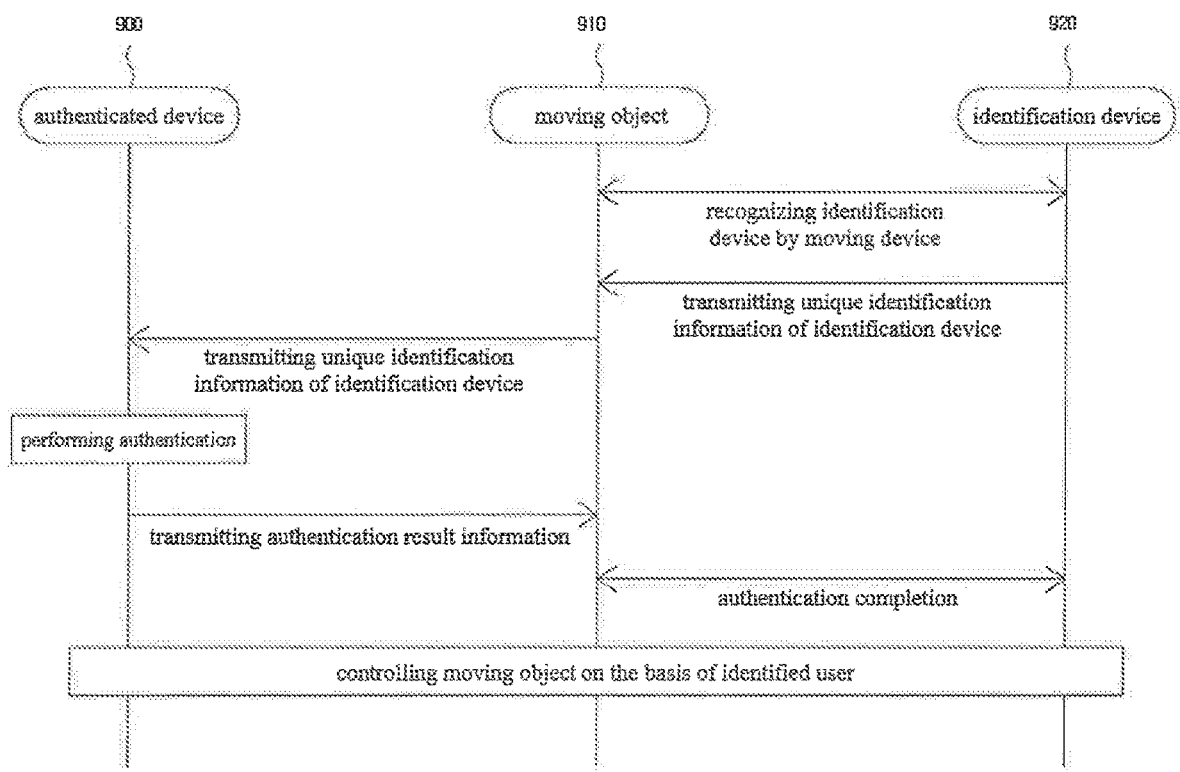
FIG. 9A, FIG. 9B and FIG. 9C are diagrams illustrating a method in which a moving object performs authentication on the basis of an identification device.

As a specific example, referring to FIG. 9A, when the moving object 910 first recognizes the identification device 920, the identification device 920 may transmit unique identification information related to the identification device to the moving object 910. Herein, the moving object 910 may perform additional authentication as described above through the unique identification information related to the identification device. The moving object 910 may transmit identification device unique identification information to the authenticated device 900. Herein, the authenticated device 900 may be a device authenticated from the moving object 910. As a specific example, the authenticated device 900 may be a smartphone of the same user as the owner of the moving object 910. That is, the moving object 910 may transmit information for additional authentication to the authenticated device 900. Thereafter, additional authentication may be performed in the authenticated device 900. For example, the authenticated device 900 may generate authentication information on the basis of the unique identification information related to the identification device. Herein, for example, the authenticated device 900 may receive an input from a user of an authenticated device 900 on the basis of the generated authentication information. Herein, when the input information and the generated authentication information match each other, the authenticated device 900 may complete authentication. For example, the smart phone user may receive a number for authentication from a moving object and input the same to the smart phone, thereby performing additional authentication. Thereafter, the authenticated device 900 may transmit authentication result information to the moving object 910. Herein, the moving object 910 may complete additional authentication on the basis of the authentication result information, and complete additional authentication with the identification device 920.

Figure 9B:
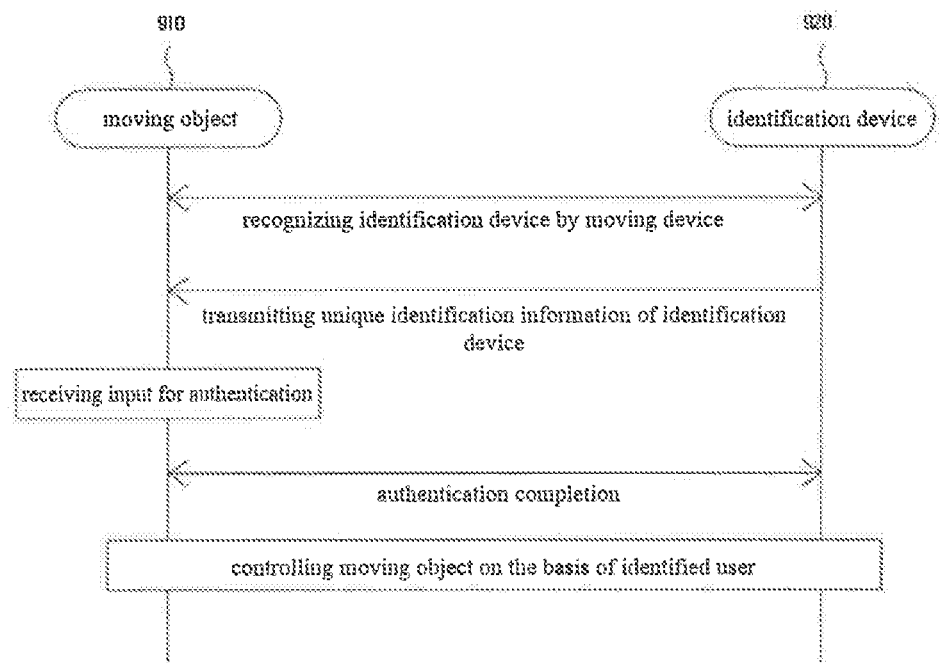

As an exemplary embodiment of the present invention, referring to FIG. 9B, when the moving object 910 first recognizes the identification device, the identification device 920 may transmit unique identification information to the moving object 910. Herein, for example, the moving object 910 may receive an input for authentication on the basis of the unique identification information transmitted by the identification device 920. That is, the moving object 910 may receive an input from a user and recognize the identification device 920 on the basis of the same.

As a more specific example, a user of the moving object 910 may previously acquire unique identification information set in the identification device 920. Herein, the unique identification information may be provided via the identification device 920 or may be provided to the user separately. Herein, when the moving object 910 receives the unique identification information from the identification device 920, the moving object 910 may receive a separate input about whether the unique identification information matches the user. That is, the user may further perform additional authentication. For example, the additional authentication may be a pin number, a serial number, or another number, but the present invention is not limited thereto.

That is, the moving object 910 and the identification device 920 may use user input information for additional authentication, but the present invention is not limited thereto.

Meanwhile, when the moving object succeeds in initial authentication on the basis of the above description, the moving object may update information on the corresponding identification device. Herein, the moving object can quickly perform authentication by directly performing the authentication procedure with the identification device without the additional procedure as described above, when the identification object is recognized again. That is, when the identification device is first mounted on the moving object, an additional procedure for checking and setting the authority may be required, and the moving object may register and operate the identification device on the basis of the same.

As an exemplary embodiment of the present invention, identification and authentication of an identification device may be performed even when the moving object is not turned on. The identification device may operate while the moving object is not turned on, as described above. Herein, for example, the identification device may perform the identification and authentication procedure even when the moving object is not turned on. For example, when the identification device is located inside the moving object, the moving object may recognize the identification device and perform an identification and authentication procedure with the recognized identification device. Herein, as an example, the moving object periodically transmits a signal for authenticating the identification device inside the moving object or transmits a signal for identification and authentication by detecting that the identification device is recognized, and but the present invention is not limited thereto. Herein, for example, the moving object may identify the existence of the identification device regardless of whether the moving object is turned on and perform the above-described identification and authentication procedure on the basis of the same, but the present invention is not limited thereto.

As an exemplary embodiment of the present invention, an identification device may be applied to a moving object as an embedded identification device (or embedded SIM, embedded SIM, or ESIM). Herein, an ESIM may refer to a digital SIM mounted inside a moving object rather than a physical card like a USIM. For example, a SIM that encrypts authentication information included in the SIM and loads the same in the moving object may be referred to as an ESIM. Herein, as an example, the information included in the ESIM of the moving object may be modified on the basis of remote or other communication. That is, an owner of the moving object may exist, and authentication information on the basis of the same may be required. Herein, since the owner of the moving object may be information which is not easily changed, the user identification information may be implemented through the ESIM, and the moving object operation may be performed through authentication. Herein, as an example, when the ESIM is applied to a moving object, authentication may be performed on the basis of an authentication system in the moving object (or mobility). As an exemplary embodiment of the present invention, authentication for the ESIM embedded in the moving object may be performed on the basis of the mobile device. For example, the mobile device may be a smart device, a head unit, or the like. That is, authentication for the ESIM embedded in the moving object may be performed on the basis of a separate mobile device.

As an exemplary embodiment of the present invention, an ESIM embedded in a moving object may be authenticated on the basis of communication with a server. For example, the smart device may recognize the SIM through communication with the base station. The ESIM of the moving object may perform authentication on the basis of the communication between the ESIM and the server according to a similar manner, and operate on the basis of the same.

As an exemplary embodiment of the present invention, an ESIM embedded in a moving object may be authenticated on the basis of a D2D scheme or an M2M scheme. For example, when the owner or driver of a moving object tries to drive the moving object, a mobile device may be provided. Furthermore, as an example, a mobile device in a moving object may be used. Herein, authentication for the ESIM embedded in the moving object may be performed on the basis of the D2D scheme with the mobile device positioned to be adjacent. For example, the authentication method as described above may be performed in consideration of moving object security.

As an exemplary embodiment of the present invention, the ESIM may not be physically present and thus may not be detached or removed. However, in the case of a general identification device, the moving object may be detached in consideration of a moving object theft or other situation. Herein, as an example, a system for preventing the moving object from being robbed and forcibly removed may be necessary. As a more specific example, the system for preventing the moving object from being robbed and forcibly removed may be configured to restrict an access as a physical or mechanical device.

As an exemplary embodiment of the present invention, the system for preventing the moving object from being robbed and forcibly removed may be a system that restricts the use of an identification device. As an exemplary embodiment of the present invention, the system for preventing the moving object from being robbed and forcibly removed may be a system that restricts authentication to prohibit separate operations. That is, the system for preventing the moving object from being robbed and forcibly removed is referred to as a system for preventing from being forcibly removed by hardware, mechanical, or software, but the present invention is not limited thereto.

For example, when an identification device is applied to a moving object, additional authentication may be required by another mobile device when the identification device is to be detached. That is, the identification device may be detached after authentication and confirmation on the basis of another device mutually authenticated with the identification device of the moving object. As an exemplary embodiment of the present invention, the identification device may be detached through personal authentication. For example, authentication may be performed on the basis of unique characteristics of the user, such as fingerprint recognition, iris recognition, or facial recognition, and detachment may be performed only by the authenticated user. Furthermore, for example, the identification device may be detached only when necessary information is authenticated on the basis of artificial intelligence. For example, only an authenticated user may perform the detachment on the basis of recognition information related to an image, a voice, or the like of the user. That is, as shown in FIG. 3, the detachment is possible depending on whether the moving object is turned on or driving, and the detachment is possible on the basis of the authentication regardless of whether the moving object is turned on or driving to secure security and accident prevention, but the present invention is not limited thereto.

Furthermore, for example, the identification device may communicate with neighboring IoT devices and receive a service on the basis of the identification device. For example, IoT devices may also be provided with an identification device. Moreover, for example, the identification devices may be applied only to smart phones at present, but a plurality of identification devices that are mutually compatible and identify the same user may be applied to a plurality of devices such as smartphones, moving objects, and home appliances. That is, the service may be provided to a plurality of devices through an identification device configured for the same user.

Also, as an example, when a moving object includes an identification device, the moving object may operate in combination with the ITS infrastructure. For example, when performing autonomous driving of a moving object, an identification device may be recognized in the moving object, and the autonomous driving service may be provided through a nearby ITS infrastructure through the recognized identification device. Herein, authentication of the user may be performed through the identification device, and the service may be provided on the basis of the authenticated user information.

Furthermore, as an example, service/security may be provided through the identification device. Furthermore, a shared service, such as a moving object sharing service, may be provided by an identification device.

Furthermore, for example, it is possible to perform control on the ITS infrastructure or the traffic system through the identification device of the moving object. For example, the communication with the server or the RSU may be performed through the identification device of the moving object, and the control may be performed on the basis of the communication.

As an exemplary embodiment of the present invention, a moving object may directly control the traffic infrastructure on the basis of edge computing. For example, user authentication may be performed through an identification device of a moving object, and the IoT or ITS infrastructures may be controlled. For example, the street lamp may be operated in an area adjacent to a moving object while driving based on the authenticated user. In other words, it is possible to prevent delays and increase operational efficiency by performing direct control through authentication of the identification device of the moving object and the surrounding infrastructure, not central control.

Furthermore, as an example, as described above, the identification device may include information related to a user. Herein, when authentication is performed on the moving object through the identification device, control of the moving object may be changed on the basis of user information included in the identification device, which was described above. For example, when a moving object completes authentication through an identification device, moving object setting information such as a sheet, a display, a moving object control, a navigation service, and the like may be automatically set on the basis of the identification device. That is, the identification device may perform not only authentication, but also function as a control device configured for increasing the convenience of using the moving object.

Furthermore, as an example, as described above, the identification device may be applied to the moving object sharing system. For example, the shared moving object may be used by a plurality of users periodically. In consideration of the foregoing, performing control of the shared moving object for each user may be inefficient for operation. Accordingly, the moving object user may be identified through the identification device, and the control for the moving object may be performed on the basis of the identification. That is, the tenant for the shared moving object mounts his/her identification device on the moving object, and utilizes the shared moving object when the identification device is recognized by the moving object. Meanwhile, for example, in the shared service, as described above, a personal setting such as a sheet, a display, a steering of a moving object, etc. may be changed on the basis of user information included in the identification device, which was described above. Furthermore, in the case of a shared service, billing for using a moving object may be performed through the identification device. In other words, since the standard for distinguishing the use of moving objects for each user is not clear, each individual may be charged through the identification device. As an exemplary embodiment of the present invention, a case where another user shares the individual moving object may be considered. Herein, as an example, the tenant may control the moving object through the lessor's identification device, Herein, the lessor may provide the tenant with the control authority for the identification device, and the tenant may control the moving object through the lessor's identification device on the basis of the granted control authority. For example, the control authority may be a password or authentication of the tenant device. As an exemplary embodiment of the present invention, both the lessor identification device and the tenant identification device may exist, and a plurality of identification devices may be recognized in the moving object, which will be described later.

As an exemplary embodiment of the present invention, when the identification device is applied to a moving object, the authentication may be performed on the basis of a server in consideration of moving object security. For example, the server may include a security certificate and information necessary for security. Only when the security is authenticated through the identification device of the moving object and the security of the server, the authentication of the moving object is completed and the moving object may be used.

As an exemplary embodiment of the present invention, when the identification device is applied to a moving object, security may be performed without a server in consideration of moving object security. For example, the moving object may communicate with surrounding moving objects or other devices based on V2X or V2V communication. Herein, each moving object or device may include hash values based on the block chain, and mutual security may be authenticated through a network structure on the basis of the foregoing. In other words, the moving object may be secured through the block chain.

Figure 9C:
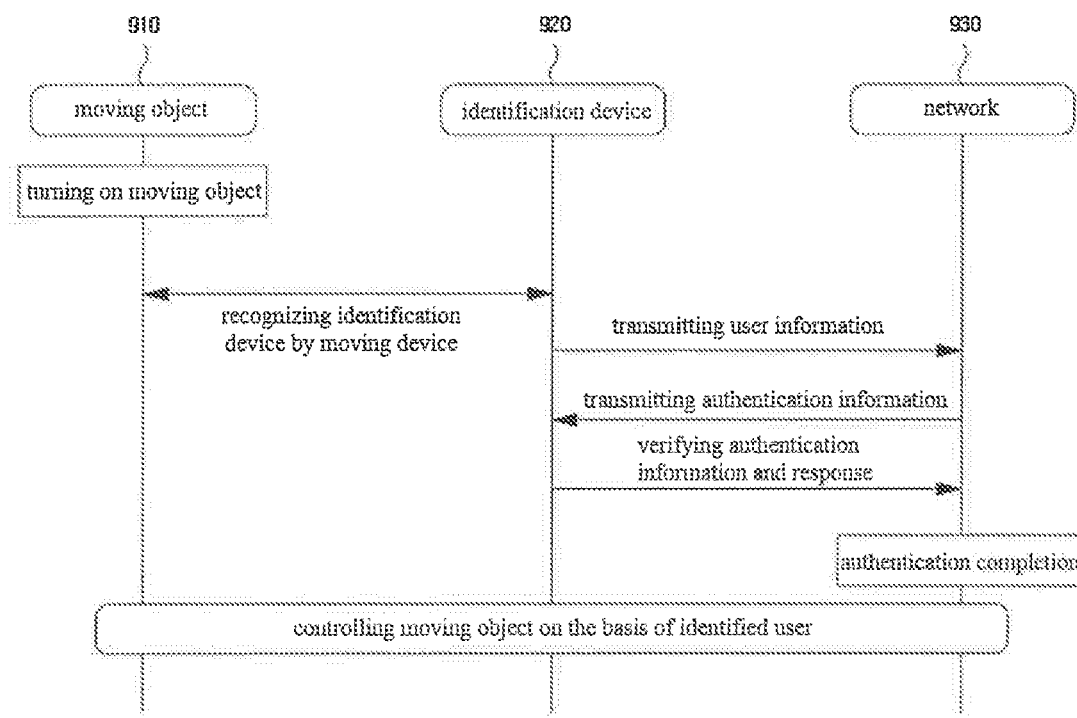

FIG. 9C is a view illustrating a method of operating a moving object on the basis of an identification device. Referring to FIG. 9C, the moving object 910 may turn on the moving object. Herein, when the moving object is turned on, it may be considered that the moving object is started up. Herein, for example, the moving object 910 may recognize the identification device 920. In more detail, the identification device 920 may be attached and detached to the moving object 910 as described above, or may be embedded in an embedded form. Herein, when the moving object 910 is turned on, the moving object 910 may detect a state in which the identification device 920 is mounted, and may perform mutual recognition on the basis of the same. Herein, when mutual recognition of the moving object 910 and the identification device 920 is completed, the identification device 920 may transmit user information to the network 930. Herein, the network 930 may transmit authentication information to the identification device 920 on the basis of the received user information. Herein, for example, the authentication information may be a secret key or an authentication key generated on the basis of user information. Thereafter, the identification device 920 confirms the authentication information on the basis of the received authentication information and the information stored in the identification device 920, transmits a response to the network 930, and the network 930 may complete authentication. Thereafter, the moving object 910 may receive various services provided in the network 930 through the identification device 920. Herein, the moving object 910 may be controlled on the basis of the identified user. Based on the above-described procedure, it is possible to provide a service for the moving object 910 to which the identification device 920 is attached.

For example, the identification device 920 described above may store respective user information. In more detail, services for moving objects may vary. For example, although a vehicle as the moving object is currently used for driving, each user may not be distinguished. However, the service provided to the user in the moving object is increasing, and setting or information in consideration of personal propensity or personal characteristics may be necessary. In consideration of the foregoing, the identification device 920 may store information or settings for a specific user and apply the same to each moving object. For example, the identification device 920 may include information related to a user. For example, the user information may include at least one of application information, navigation information, billing information, and moving object setting information. For example, when the moving object 910 is controlled through the identification device 920, the moving object 910 may communicate with an external device through the network 930 on the basis of the identification device 920. For example, the moving object 910 may exchange data information and a voice call signal with an external device in the same manner as a smart device (e.g., a smart phone). That is, the moving object 910 may perform the same function as that of the existing smart device. Herein, for example, for the forgoing, the identification device 920 may store information related to a user. As an example, the information may be stored in the phone book as described above. Herein, the user of the moving object 910 may communicate with an external device through the information included in the identification device 920. As an exemplary embodiment of the present invention, in consideration of the above-described operation, the identification device 920 may include billing information. For example, the identification device 920 may include billing information based on data information transmitted and received through the network 930. Herein, the network 930 or the server may provide a service for data use or voice signal to the identification device 920 on the basis of the above-mentioned billing information, but the present invention is not limited thereto. That is, in the case of using a moving object, a service provided and data used may be managed on the basis of the identification device 920. As an exemplary embodiment of the present invention, the identification device 920 may further include moving object setting information and moving object related information. For example, in the case of a user using the moving object 910, the setting of the moving object 910 may be different for each user. For example, the moving object setting information may include autonomous driving level information, vehicle seat, instrument panel mode setting, use channel, navigation setting, personal device setting, mirror setting, and the like. Furthermore, as an example, the moving object setting information may include information on driving propensity set in a user's personal device with respect to various driving environments, such as the position and height of a driver's seat, color and brightness of an interior tight, the position and angle of a room mirror, a side mirror, and a lamp, an in-vehicle temperature range (air conditioner and heater), a steering wheel angle, a tire pressure, a transmission setting mode (Normal, Eco, Power mode, etc.), a wireless communication connection mode (WAVE, cellular, etc.), and an autonomous driving function setting parameter range (speed and vehicle interval, lane change transverse speed, acceleration and deceleration, etc.). Furthermore, the moving object setting information may include a variety of information, in addition to the above-described information. That is, the user setting information may be included in the identification device 920 so that a customized service is provided to the user using the moving object 910 and the moving object 910 is controlled in consideration of the user. That is, the service provided through the moving object 910 may be performed on the basis of the identification device 920.

As an exemplary embodiment of the present invention, the identification device 920 may be configured to perform authentication through the network 930 but not to perform communication with an external communication network. For example, the moving object 910 may be identified and authenticated on the basis of the identification device 920 as described above, but may limit communication with an external communication network in consideration of security and accident risk. Herein, the identification device 920 may be a local area network, and may enable communication with other devices existing in the moving object. That is, even when the control of the moving object 910 is performed by the identification device 920, the identification device performs communication and data exchange with specific devices within a certain range in consideration of the moving object, and provides the service on the basis of the same.

Furthermore, for example, a plurality of users may be registered in one identification device. Herein, for example, in the case of operation based on the foregoing, each service and data use may be set for a plurality of users. Herein, for example, billing information may also be set and managed for each of a plurality of users. Meanwhile, as an exemplary embodiment of the present invention, each service and data use may be individually allowed for a plurality of users in one identification device. However, billing information or data usage information regarding service and data usage may be managed as one. That is, when considering service provision, the service may be provided to each of a plurality of users registered in one identification device, but the service may be managed as the identification device itself, but the present invention is not limited thereto.

As an exemplary embodiment of the present invention, when a plurality of users are registered in one identification device, moving object common information and user specific information may be distinguished and managed. For example, even when a plurality of users are registered in one identification device, common information considering moving object identification may be needed. Herein, it is unnecessary to distinguish each user with respect to common information, which may be managed by the identification device itself. For example, the vehicle status information may not be different for each user, and may be common information. Meanwhile, the navigation setting or the vehicle seat setting may be different for each user, and thus may be user specific information. Herein, for example, the identification device may separately use the common information and the user specific information on the basis of the above description, but the present invention is not limited thereto.

Meanwhile, in view of the foregoing, a plurality of identification devices may be mounted on the moving object. For example, the plurality of identification devices described above may be identification devices for the same user. That is, the same user may control the moving object on the basis of the plurality of identification devices. Herein, for example, a specific device among a plurality of identification devices may manage service and data provided to a communication network connected to an external device after recognizing the moving object as described above. Meanwhile, as described above, a specific device among the plurality of identification devices may manage service and data on the basis of a local area network as a specific device inside the moving object after recognizing the moving object. For example, when data exchange is required to make a call with another user through a moving object or to provide various services, the service may be provided to the moving object as an identification device which may be connected to an external network. Meanwhile, it is possible to control service and data recognized only inside the moving object as a specific identification device to prevent external exposure in terms of autonomous driving mode or vehicle security. For example, external access may be prevented for information acquired or used when a user utilizes a moving object, such as autonomous driving information or user driving pattern analysis information. In consideration of the foregoing, a plurality of identification devices may exist in the moving object, and each of the moving objects may operate.

Furthermore, as a specific example, various services may be provided through an identification device of a moving object. For example, the moving object driving record may be stored through the identification device of the moving object. Furthermore, moving object operation records may be verified for each individual and used through a server or a system.

The existing moving object operation information and related information may be stored and shared on the basis of the moving object. Herein, when the identification device is applied to the moving object, the user may be identified through the identification device, and moving object operation information and related information may be stored and used for each user. For example, the moving object driving information may include at least one of visit area information, driving distance information, driving pattern information, and driving route information. Furthermore, the moving object operation information may be information which may be used on the basis of the identification device user with respect to the moving object, but the present invention is not limited thereto. Herein, the user may store and use moving object operation information related to the user on the basis of the identification device, and may use the related information even when the moving object is changed. For example, the user may be provided with the service through autonomous driving or an ITS infrastructure on the basis of the information stored in the identification device. For example, the user may be provided with the service in relation to his/her own driving pattern, such as autonomous driving level, neighboring restaurant information, and information on a moving route. Herein, as described above, the information may be managed through the identification device.

Figure 10:
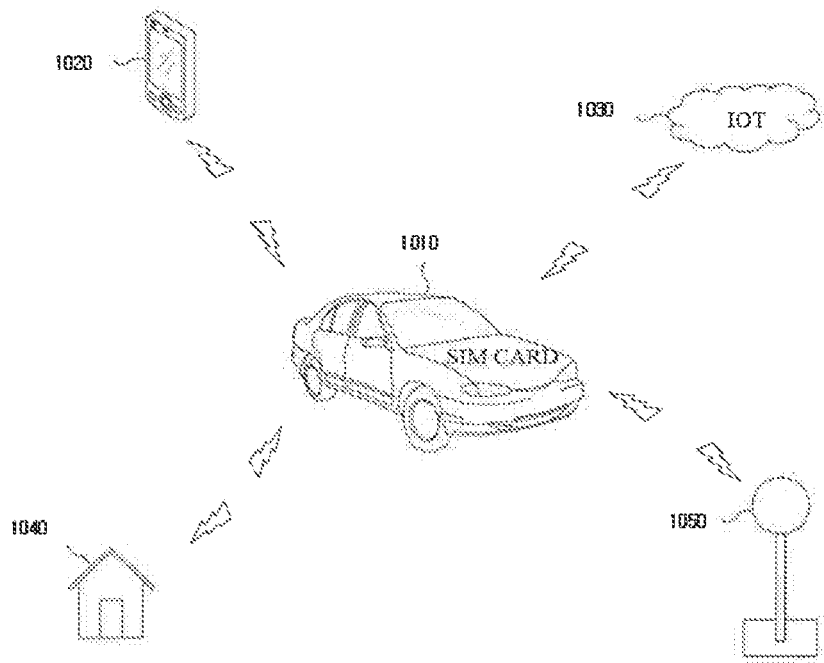
FIG. 10 is a diagram illustrating a method in which a moving object provides a service in communication with other devices on the basis of an identification device.

Also, as an example, referring to FIG. 10, the moving object 1010 may communicate with another device through an identification device. For example, the other device may be a smart device 1020, an IoT-based peripheral device 1030, a communicable home appliance 1040, or a device such as an RSU or ITS infrastructure 1050. Herein, the moving object 1010 may be identified and authenticated through an identification device, and thus may communicate with the above-described devices capable of communicating through the identification device. As an exemplary embodiment of the present invention, an identification device (e.g., USIM) of a smart device may be a device compatible with the identification device of the moving object. Furthermore, other identification devices may be mounted on other devices in the same manner as moving objects, and communication and service may be provided on the basis of the identification devices. As an exemplary embodiment of the present invention, a user may own an identification device configured for each device. That is, each of the devices described above may be provided with an identification device, and the user information indicated by the corresponding identification device may be the same. That is, the same user may use the identification device on the basis of the same user ID for various devices. Herein, for example, the moving object and another device may be used in conjunction with each other on the basis of the same user ID information. Herein, a plurality of devices is controlled on the basis of the same user ID and the same user, thereby improving security. Furthermore, each device may store information necessary for a user and then transmit the information to another device. For example, each device may periodically update usage history information related to the device on the basis of machine learning. Thereafter, the updated usage history information may be exchanged with another device, and the other device may be controlled by reflecting the information. That is, the user may control various devices through a plurality of identification devices on the basis of the same ID. Herein, billing information may also be provided on the basis of one user ID, thereby increasing user convenience.

Figure 11:
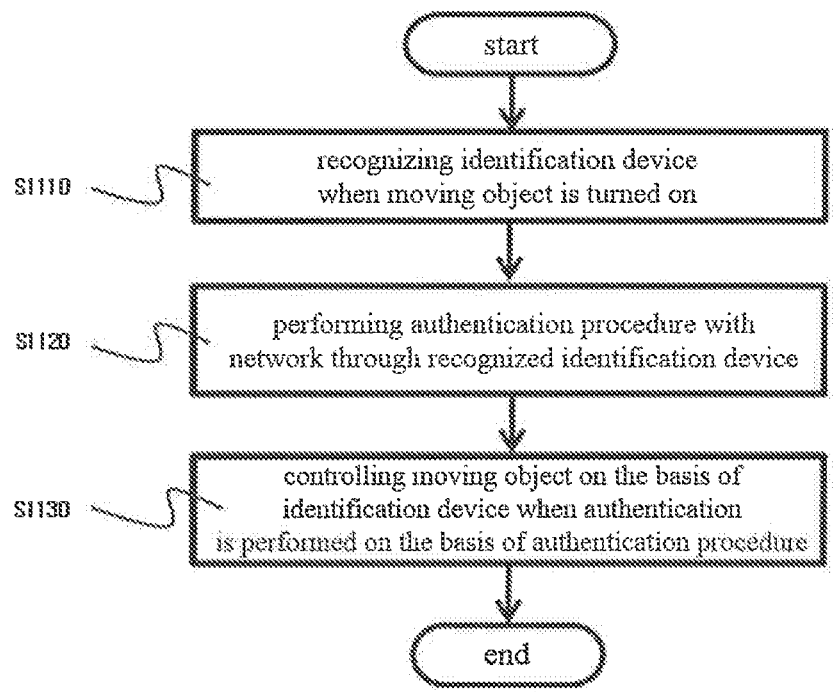
FIG. 11 is a flowchart illustrating a method of operating a moving object.

FIG. 11 is a view illustrating a method of operating a moving object on the basis of an identification device. Referring to FIG. 11, when the moving object is turned on, the identification device may be recognized (S1110). For example, when the moving object is a vehicle, when the vehicle is started up, the moving object may identify the identification device through the contact portion and perform recognition thereof. Herein, when the recognition of the moving object and the identification device is completed, the authentication procedure may be performed with the network through the recognized identification device (S1120). Thereafter, when the identification device and the network are authenticated on the basis of the authentication procedure, the moving object may be controlled on the basis of the identification device (S1130). For example, the identification device may include moving object setting information and user information on the basis of the user ID. For example, the moving object setting may be changed on the basis of the moving object setting information. Furthermore, information related to a moving object operation may be processed on the basis of user information, but the present invention is not limited thereto.

Figure 12:
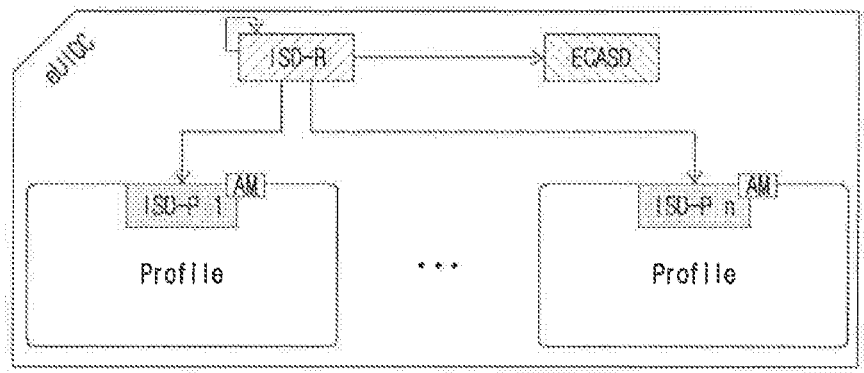
FIG. 12 is a diagram illustrating an embedded identification device.

FIG. 12 is a diagram illustrating a method of performing operation on the basis of an embedded identification device. For example, as described above, the embedded identification device or the identification device may store profile information as shown in FIG. 12. Herein, for example, the profile information may be user related information or information stored for using the moving object. Herein, for example, a configuration that makes it possible to access a profile and a configuration that performs authentication with a moving object may be distinguished in consideration of security of a moving object and complementation of an identification device. That is, according to the configuration that makes it possible to access the profile from the embedded identification device, information related to the control of the moving object may be obtained from the profile, and the information may be transmitted to a configuration capable of authenticating with the moving object. Furthermore, for example, the operation is possible on the basis of a configuration other than the configuration disclosed in FIG. 12, but the present invention is not limited thereto.

Figure 13:
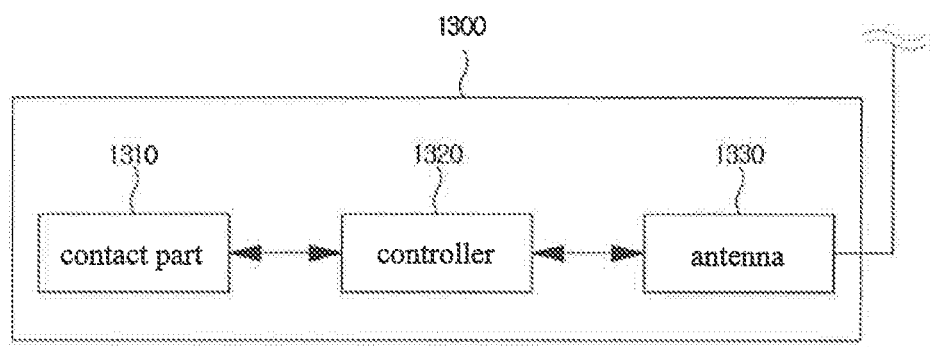
FIG. 13 is a diagram illustrating a device configuration of an identification device.

FIG. 13 is a view illustrating an identification device. Referring to FIG. 13, an identification device 1300 may include a contact portion 1310 which is in contact with a moving object or another device to be recognized. Furthermore, as an example, the identification device 1300 may include a controller 1320 for controlling and managing an operation on the basis of the identification device 1300. Furthermore, the identification device 1300 may include an antenna unit 1330 that performs communication with other devices and exchanges data. Herein, for example, the controller 1320 may manage the above-described contact 1310 and the transceiver 1330, and may control other components. Furthermore, the above-described configuration may be a hardware configuration or a software configuration. That is, it may refer to a configuration physically included in the identification device 1300 or a software configuration which is operated on the basis of the operation and function of the identification device 1300, but the present invention is not limited thereto.

Figure 14:
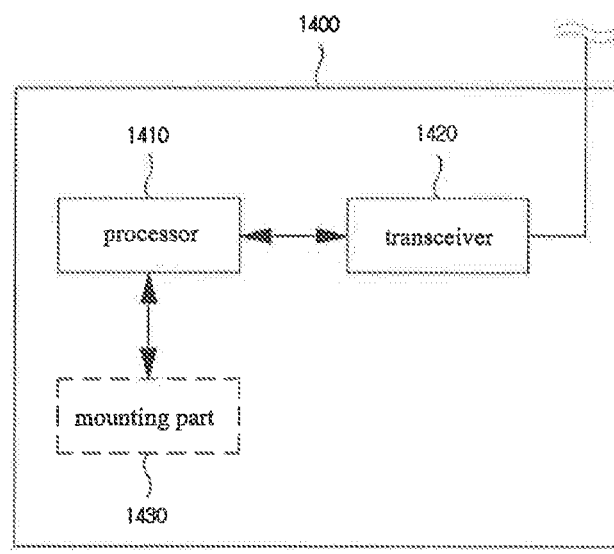
FIG. 14 is a diagram showing the configuration of a device.

FIG. 14 is a diagram illustrating a configuration of the device. Referring to FIG. 14, the device may include at least one of the above-described moving object, device, server, and RSU. That is, the device may be a device that communicates with another device to be interlocked, but the present invention is not limited thereto. For example, the device 1400 may include a processor 1410 and a transceiver 1420 for the above-described operation. That is, the device may include a configuration necessary for communicating with another device. Furthermore, as an example, the device may include other components in addition to the above-described configuration. That is, the apparatus is only a configuration including the above-described apparatus configured for performing communication with other devices and may be an apparatus operating on the basis of the above-described description, and the present invention is limited thereto.

Furthermore, as an example, the device 1400 may further include a mounting part 1430 on which another device (e. g., identification device) is mounted. Herein, the mounting part may be included in the moving object in the form as described above with reference to FIG. 2A, FIG. 2B, FIG. 2C, and FIG. 2D. For example, the mounting part 1430 may be implemented in any one area in front of a driver's seat inside the moving object. Furthermore, as an example, the mounting part 1430 may be implemented in a passenger seat kit inside the moving object. Furthermore, as an example, the mounting part 1430 may be implemented in a mirror inside the moving object. Furthermore, as an example, the mounting part 1430 may be implemented in the form of a cradle or paddle in the moving object, as described above. That is, the device 1400 may further include a mounting part 1430 for recognizing the identification device as another device as described above, and may recognize the other device and perform authentication on the basis of the same. Herein, for example, the mounting part 1430 may have a configuration in which the above-described device of FIG. 13 is mounted. As an exemplary embodiment of the present invention, the mounting part 1430 may be implemented inside a moving object as shown in FIG. 8. Herein, the mounting part 1430 may be implemented inside the device 1400 in a physical configuration. As an exemplary embodiment of the present invention, the mounting part 1430 may be implemented in the device 1400 in a software configuration, Herein, when the mounting part 1430 is implemented in the device 1400, as described above, the identification device may be implemented in the device 1400 in a physical configuration or a software configuration, but the present invention is not limited thereto.

While the example methods of the present invention described above are represented as a series of operations for clarity of description, it is not intended to limit the order in which the steps are performed, and each step may be performed simultaneously or in a different order as necessary. To implement the method according to an exemplary embodiment of the present invention, the illustrated step may further include other steps, may include remaining steps except for some steps, or may include other additional steps except for some steps.

The various embodiments of the present invention are not an exhaustive list of all possible combinations, and are intended to describe representative aspects of the present invention, and the matters described in the various embodiments may be applied independently or in combination of two or more.

Furthermore, various embodiments of the present invention may be implemented by hardware, firmware, software, or a combination thereof. The hardware may be implemented by one or more of application specific integrated Circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like.

It is intended that the scope of the present invention includes software or machine-executable instructions (e.g., an operating system, an application, firmware, a program, etc.) that causes an operation in accordance with various embodiments to be executed on an apparatus or a computer, and non-transitory computer-readable media that are executable on a device or computer in which such software or instructions, and the like are stored.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a moving object using an identification device, the method comprising:
   recognizing the identification device by the moving object;
   identifying and authenticating a user through the recognized identification device; and
   providing a service to the authenticated user,
   wherein when the moving object and the identification device satisfy a predetermined condition, the identification device is switched from a mounted state in which the identification device is mounted to a removal state configured of being detached from the moving object, and
   wherein when the identification device is detached while the moving object is turned on, authentication is performed through another device based on the identification device, and when the authentication is completed, the identification device is switched to the removal state configured of being detached.

2. The method of claim 1, wherein when boarding of the user is recognized, the recognizing of the identification device is performed, and
   the recognizing of the identification device is performed regardless of whether the moving object is turned on.

3. A method of detaching an identification device from a moving object, the method comprising:
   mounting the identification device on the moving object to be recognized; and
   detaching the identification device from the moving object,
   wherein when the moving object and the identification device satisfy a predetermined condition, the identification device is switched from a mounted state in which the identification device is mounted to a removal state configured of being detached from the moving object, and
   wherein when the identification device is detached while the moving object is turned on, authentication is performed through another device based on the identification device, and when the authentication is completed, the identification device is switched to the removal state configured of being detached.

4. The method of claim 3, wherein when the moving object is turned off, the predetermined condition is satisfied.

5. The method of claim 3, wherein when the moving object is driving while being turned on, the identification device is not configured to be detached.

6. The method of claim 3, wherein the moving object and the identification device perform an authentication procedure, and when the authentication procedure is completed, the predetermined condition is satisfied so that the identification device is switched to the removal state configured of being detached.

7. The method of claim 6, wherein when the moving object and the identification device perform the authentication procedure, the moving object is configured to transmit a message for the authentication procedure to another device and to receive a response message for completing the authentication procedure from another device so that the authentication procedure is finished.

8. The method of claim 7, wherein another device is a device registered in the moving object or a device authenticated to the moving object.

9. The method of claim 6, wherein the authentication procedure is performed, based on at least one of iris recognition, fingerprint recognition, face recognition, voice recognition, vehicle head unit input, and FOB key.

10. The method of claim 9, wherein user identification information for the authentication procedure is stored in the moving object, and the authentication procedure is performed based on the stored user identification information.

11. The method of claim 6, wherein when the moving object determines that the identification device is detached before the authentication procedure is completed, the moving object is configured to determine whether the identification device is detached in an unauthorized manner.

12. The method of claim 11, wherein the moving object is configured to determine whether the identification device is detached in an unauthorized manner through information exchange with an external device.

13. The method of claim 11, wherein when the moving object determines that the identification device is detached in an unauthorized manner, the moving object is configured to transmit unauthorized detachment related information to an external device.

14. The method of claim 13, wherein the external device includes at least one of a server in which the moving object is registered and a mobile device in which the moving object is registered.

15. The method of claim 13, wherein when the moving object determines that the identification device is detached in an unauthorized manner while driving, driving state information related to the moving object is obtained, and the driving of the moving object terminates based on the driving state information.

16. The method of claim 3, wherein when the identification device is detached from the moving object, the moving object is switched to a standby mode.

17. The method of claim 16, wherein the moving object is switched to a state in which only an operation for an emergency situation is performed in the standby mode.

18. A moving object to which an identification device is applied, the moving object comprising:
    a transceiver configured of transmitting and receiving a signal; and
    a processor configured of controlling the transceiver;
    wherein the processor is configured to recognize the identification device when the identification device is mounted, and configured to determine that the identification device is detached from the moving object,
    wherein the identification device is switched from a mounted state in which the identification device is mounted to a removal state configured of being detached from the moving object when the moving object and the identification device satisfy a predetermined condition, and
    when the identification device is detached while the moving object is turned on, authentication is performed through another device based on the identification device, and when the authentication is completed, the predetermined condition is satisfied so that the identification device is switched to the removal state configured of being detached.

19. The moving object of claim 18, wherein when the moving object is turned off, the predetermined condition is satisfied.

* * * * *